United States Patent
Huma

(10) Patent No.: US 6,876,617 B1
(45) Date of Patent: Apr. 5, 2005

(54) RECORDING MEDIUM, RECORDER, AND PLAYER

(75) Inventor: Masato Huma, Aichi (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/446,981

(22) PCT Filed: Jun. 29, 1998

(86) PCT No.: PCT/JP98/02908

§ 371 (c)(1),
(2), (4) Date: Dec. 30, 1999

(87) PCT Pub. No.: WO99/01868

PCT Pub. Date: Jan. 14, 1999

(30) Foreign Application Priority Data

Jul. 1, 1997 (JP) .............................. 9-191808

(51) Int. Cl.[7] .................................................. G11B 5/09
(52) U.S. Cl. .............................. 369/59.21; 369/59.27; 369/94
(58) Field of Search ........................ 369/124.04, 124.05, 369/124.06, 124.09, 94, 275.1, 275.3, 59.13, 59.14, 59.21, 59.25, 59.27; 386/124, 125, 126, 95, 96

(56) References Cited

U.S. PATENT DOCUMENTS

| | | | |
|---|---|---|---|
| 5,218,599 A | | 6/1993 | Tsuyoshi et al. .......... 369/275.1 |
| 5,696,754 A | * | 12/1997 | Nishizawa ................ 369/275.1 |
| 5,706,269 A | | 1/1998 | Ogura et al. ................. 369/94 |
| 5,732,065 A | * | 3/1998 | Braat et al. .................... 369/94 |
| 5,748,594 A | * | 5/1998 | Nishio et al. ............. 369/59.13 |
| 6,038,208 A | * | 3/2000 | Shikunami et al. ....... 369/275.3 |
| 6,115,341 A | * | 9/2000 | Hirai ......................... 369/59.13 |
| 6,269,065 B1 | * | 7/2001 | Ogura et al. .................... 369/94 |

FOREIGN PATENT DOCUMENTS

| | | |
|---|---|---|
| EP | 0 558 853 A2 | 9/1993 |
| EP | 0 720 159 | 7/1996 |
| EP | 0 734 019 A1 | 9/1996 |
| EP | 0 745 985 | 12/1996 |
| EP | 0 758 126 A2 | 2/1997 |
| EP | 0 777 227 | 6/1997 |
| JP | 1-282779 | 11/1989 |
| JP | 2-23574 | 1/1990 |
| JP | 5-250811 | 9/1993 |
| JP | 5-250813 | 9/1993 |

(Continued)

OTHER PUBLICATIONS

Copy of European Patent Office Communication including European Search Report for corresponding European Patent Application 98929740 dated Jan. 23, 2003.

*Primary Examiner*—Thang V. Tran
(74) *Attorney, Agent, or Firm*—Westerman, Hattori, Daniels & Adrian, LLP

(57) ABSTRACT

A recording medium, such as an optical disk, a recorder for recording data on the recording medium, and a player for playing back the data are described. Music information can be recorded on the recording medium with higher sound quality than that achieved by a conventional compact disk, and the music information can be played back with higher quality than that achieved by the conventional compact disk. Further, the recording medium can be played back through use of a conventional CD player.

The recording medium has two recording layers, i.e., layer A and layer B. Conventional CD data are recorded on the layer A, and data for complementing the CD data are recorded on the layer B. The two data sets are merged into a single data set during playback, thereby enabling playback of data in higher quality and resolution than the CD data.

9 Claims, 15 Drawing Sheets

FOREIGN PATENT DOCUMENTS

| | | |
|---|---|---|
| JP | 7-181996 | 7/1995 |
| JP | 8-46517 | 2/1996 |
| JP | 8-63900 | 3/1996 |
| JP | 8-63901 | 3/1996 |
| JP | 8-307814 | 11/1996 |
| JP | 8-329614 | 12/1996 |
| JP | 9-7298 | 1/1997 |
| JP | 9-55038 | 2/1997 |
| JP | 9-509776 | 9/1997 |
| JP | 9-265734 | 10/1997 |
| WO | WO 95/16263 | 6/1995 |
| WO | WO 96/19807 | 6/1996 |
| WO | WO 9630906 A1 * | 10/1996 |
| WO | 97/09716 | 3/1997 |

* cited by examiner

LAYER A: CD
(RECORDED AT LOW DENSITY)

LAYER B
(RECORDED AT HIGH DENSITY)

LAYER A (CD)

LAYER B
(RECORDED AT DIFFERENT
POSITIONS)

(NOTE) "B-A" VISUALLY REPRESENTS THE CONCEPT OF A COMPLEMENT OF "A" AND ACTUALLY ASSUMES A SIZE OF 24 BITS

RECORDING MEDIUM, RECORDER, AND PLAYER

BACKGROUND OF THE INVENTION

1. Description of the Related Art

The present invention relates to a recording medium, such as an optical disk, a recorder used for recording data on the recording medium, and a player for playing back the data.

2. Background

Information of interest, such as audio information, is recorded on a compact disk (CD), serving as an optical disk, in the form of CD-format data (hereinafter referred to as "CD data"). Specifically, information is sampled at a cycle of 44.1 kHz, and each of the thus-sampled values is quantized into 16-bit words. The thus-quantized words are recorded after having been subjected to predetermined processing, such as eight-to-fourteen MODULATOR (EMF). More specifically, after having been quantized into 20-bit or 24-bit words, a sample is again quantized into 16-bit words in accordance with a predetermined scheme. Resolution used for quantizing a sample is higher than that used for quantizing the sample into CD data.

Demand exists for recording audio information, whose sound quality is higher than that of a conventional CD, on an optical disk and playing back the audio information with higher sound quality than that achieved by the conventional CD. Demand also exists for playing back the optical disk with the same sound quality as that achieved by the conventional CD, through use of a conventional CD player. In other words, there exists demand for an optical disk which is compatible with a conventional CD player and records music information of higher sound quality, as well as demand for a player capable of playing back the optical disk with higher sound quality. Such demands for higher sound quality and compatibility are not confined to CDs but exist for other types of known recording media as well. Further, such demand is not limited to the field of audio but also applies to the field of video.

Accordingly, the object of the present invention is to respond to these demands.

SUMMARY OF THE INVENTION

The present invention has been conceived to solve the previously-described problems. According to a first aspect of the present invention, there is provided a recording medium having a plurality of signal recording layers, wherein first data are recorded on one of the signal recording layers, and data relevant to the first data are recorded on the other signal recording layer.

In the recording medium according to the first aspect of the present invention, first data are recorded on one of the signal recording layers, and data relevant to the first data are recorded on the other signal recording layer. Therefore, high-quality, high-resolution data can be produced by merging the relevant data and the first data into a single data set during playback. Alternatively, the relevant data may be recorded as data which can be solely played back and which are higher in quality and resolution than the first data. Further, so long as ordinary CD data are recorded as the first data, the ordinary CD data can be played back.

According to a second aspect of the present invention, the recording medium as defined in the first aspect of the present invention is further characterized in that the relevant data complement the first data. Consequently, higher-quality data can be produced by merging the first data and the relevant data into a single data set, during playback.

According to a third aspect of the present invention, the recording medium as defined in the second aspect of the present invention is further characterized in that the relevant data are intended to further improve the quality of the first data.

According to a fourth aspect of the present invention, the recording medium as defined in the third aspect of the present invention is further characterized in that the relevant data comprise data based on data sampled at intermediate times between sampling times used for generating the first data. The first data and the relevant data are merged into a single data set during playback, whereby the data set is greater than the first data in terms of the number of samples. Accordingly, higher-quality, higher-resolution data can be played back.

According to a fifth aspect of the present invention, the recording medium as defined in the third or fourth aspect of the present invention is further characterized in that after having been re-quantized, the first data are recorded as data having a predetermined number of bits, and that the relevant data include data pertaining to a difference between the first data and at least a portion of the data which have served as the basis for re-quantizing the first data into the data having a predetermined number of bits. So long as the first data and the relevant data are merged into a single data set during playback, there can be played back data which are greater in the number of bits than the first data. Consequently, higher-quality, higher-resolution data can be played back.

According to a sixth aspect of the present invention, the recording medium as defined in the third or fourth aspect of the present invention is further characterized in that the relevant data comprise data whose frequency components are of higher order than the frequency components of the first data. So long as the first data and the relevant data are merged into a single data set during playback, there can be played back data which are wider in frequency bandwidth than the first data. Consequently, higher-quality, higher-resolution data can be played back.

According to a seventh aspect of the present invention, the recording medium as defined in the second aspect of the present invention is further characterized in that the relevant data are of higher quality than the first data and can be played back solely. For example, in a case where ordinary CD data are recorded as the first data, the ordinary CD data can be played back by playback of the first data. Further, so long as the relevant data are played back, there can be played back data which are higher in quality and resolution than the ordinary CD data.

According to an eighth aspect of the present invention, the recording medium as defined in the seventh aspect of the present invention is further characterized in that the relevant data correspond to data sampled at a cycle shorter than that at which the first data have been sampled. As a result of playback of the relevant data, there can be produced data which are greater in the number of samples than the first data. Therefore, there can be played back higher-quality, higher-resolution data.

According to a ninth aspect of the present invention, the recording medium as defined in the seventh or eight aspect of the present invention is further characterized in that the relevant data are wider in frequency bandwidth than the first data. As a result of playback of the relevant data, there can be produced data which are greater in the number of samples than the first data. Therefore, there can be played back higher-quality, higher-resolution data.

According to a tenth aspect of the present invention, the recording medium as defined in the first, second, third, fourth, seventh, or eight aspect of the present invention is further characterized in that the relevant data are recorded at a higher density than are the first data. Even in a case where the relevant data are greater in amount than the first data, the relevant data can be efficiently recorded by way of an increase in the density at which the relevant data are recorded.

According to an eleventh aspect of the present invention, there is provided a recorder for recording data on a recording medium, comprising:

a first data output device which outputs sample data, the sample data being formed by sampling information to be recorded at a given cycle and quantizing the thus-sampled data into data having a predetermined number of bits;

a re-quantization device which re-quantizes the data output from the first data output device into data whose number of bits is lower than the predetermined number of bits;

a second data output device which outputs data, the data being produced by sampling the information to be recorded at a cycle shorter than the predetermined cycle and quantizing the thus-sampled information into data having a predetermined number of bits;

a separation device for dividing the data output from the second data output device into a plurality of sample data sets which have been sampled at the predetermined cycle and at different times;

a subtraction device which calculates a difference between the data output from the re-quantization device and the predetermined sample data output from the separation device; and a multiplexing device which multiplexes into a single data set the data output from the subtraction device and the sample data, which are output from the separation device but differ from the predetermined sample data.

In the recorder as defined in the eleventh aspect of the present invention, the data output from the re-quantization device are recorded on one recording layer, and the data output from the multiplexing device are recorded on the other recording layer. So long as the data recorded on the respective recording layers are merged into a single data set during playback, higher-quality, higher-resolution data can be played back. In other words, there can be produced data which are greater in the number of sampling times than the first data. If the data output form the re-quantization device are recorded as ordinary CD data, the data can be played back through use of even a conventional CD player.

According to a twelfth aspect of the present invention, there is provided a recorder for recording data on a recording medium, comprising:

a filtering device which limits the bandwidth of information to be recorded to a predetermined frequency bandwidth;

a conversion device which samples the data output from the filtering device at a predetermined cycle and quantizes the thus-sampled data into data having a predetermined number of bits;

a diminishing device which performs a diminishing operation on the data output from the conversion device;

a re-quantization device which re-quantizes the data output from the diminishing device into data whose number of bits is lower than the predetermined number of bits;

a separation device for dividing, into a plurality of sample data sets having been sampled at the predetermined cycle and at different times, data which are obtained by limiting the bandwidth of information to be recorded to a predetermined frequency bandwidth, sampling the information at a predetermined cycle, and quantizing the sampled-information into data having a predetermined number of bits;

a subtraction device which calculates a difference between the data output from the re-quantization device and the predetermined sample data output from the separation device; and a multiplexing device which multiplexes into a single data set the data output from the subtraction device and the sample data, which are output from the separation device but differ from the predetermined sample data.

In the recorder as defined in the twelfth aspect of the present invention, the data output from the re-quantization device are recorded on one recording layer, and the data output from the multiplexing device are recorded on the other recording layer. So long as the data recorded on the respective recording layers are merged into a single data set during playback, higher-quality, higher-resolution data can be played back. In other words, there can be produced data which are greater in the number of sampling times and wider in frequency bandwidth than the first data. If the data output form the re-quantization device are recorded as ordinary CD data, the data can be played back through use of a conventional CD player.

According to a thirteenth aspect of the present invention, there is provided a recorder for recording data on a recording medium, comprising:

a filtering device which limits the bandwidth of information to be recorded to a predetermined frequency bandwidth;

a conversion device which samples the data output from the filtering device at a predetermined cycle and quantizes the thus-sampled data into data having a predetermined number of bits;

a diminishing device which performs a diminishing operation on the data output from the conversion device;

a re-quantization device which re-quantizes the data output from the diminishing device into data whose number of bits is lower than the predetermined number of bits;

a separation device for dividing, into predetermined frequency bands, data which are obtained by limiting the bandwidth of information to be recorded to a predetermined frequency bandwidth, sampling the information at a predetermined cycle, and quantizing the sampled-information into data having a predetermined number of bits;

a subtraction device which calculates a difference between the data output from the re-quantization device and the data of a certain band output from the separation device; and a multiplexing device which multiplexes into a single data set the data output from the subtraction device and the data of another frequency band output from the separation device.

In the recorder as defined in the thirteenth aspect of the present invention, the data output from the re-quantization device are recorded on one recording layer, and the data output from the multiplexing device are recorded on the other recording layer. So long as the data recorded on the respective recording layers are merged into a single data set during playback, higher-quality, higher-resolution data can be played back. In other words, there can be produced data which are wider in frequency bandwidth than the first data. If the data output form the re-quantization device are recorded as ordinary CD data, the data can be played back through use of even a conventional CD player.

According to a fourteenth aspect of the present invention, there is provided a recorder for recording data on a recording medium, comprising:

a first data output device which outputs sample data, the sample data being formed by sampling at a given cycle information to be recorded and quantizing the thus-sampled data into data having a predetermined number of bits;

a re-quantization device which re-quantizes the data output from the first data output device into data whose number of bits is lower than the predetermined number of bits; and a second data output device which outputs data, the data being produced by sampling, at a cycle shorter than the predetermined cycle, the information to be recorded and quantizing the thus-sampled information into data having a predetermined number of bits.

The data output from the re-quantization device are recorded on one recording layer, and the data output from the second data output device are recorded on the other recording layer. So long as the data recorded on the other recording layer are played back during playback, the resultant data become greater in amount than the data recorded on the one layer. Accordingly, higher-quality, higher-resolution data can be played back. If the data output form the re-quantization device are recorded as ordinary CD data, the data can be played back through use of even a conventional CD player.

According to a fifteenth aspect of the present invention, there is provided a recorder for recording data on a recording medium, comprising:

a filtering device which limits the bandwidth of information to be recorded to a predetermined frequency bandwidth;

a conversion device which samples at a predetermined cycle the data output from the filtering device and quantizes the thus-sampled data into data having a predetermined number of bits; a diminishing device which performs a diminishing operation on the data output from the conversion device;

a re-quantization device which re-quantizes the data output from the diminishing device into data whose number of bits is lower than the predetermined number of bits; and a writing device for writing onto the recording medium the data output from the conversion device.

The data output from the re-quantization device are recorded on one recording layer, and the data output from the multiplexing device are recorded on the other recording layer. So long as the data recorded on the other recording layer are played back during playback, the resultant data become wider in frequency band than the data recorded on the one layer. Accordingly, higher-quality, higher-resolution data can be played back. If the data output from the re-quantization device are recorded as ordinary CD data, the data can be played back through use of even a conventional CD player.

According to a sixteenth aspect of the present invention, there is provided a player for reading data recorded on a recording medium having a plurality of data recording layers, the layers comprising at least a first recording layer and a second recording layer, the player comprising:

a reader for reading first data recorded on the first recording layer and second data which are recorded on the second recording layer and are relevant to the first data; and a data generation device which produces playback data on the basis of the first and second data read by the reader.

Since playback data are produced and played back on the basis of the first and second data, there can be played back data which are higher in quality and resolution than data which would be produced by playback of only the first data.

According to a seventeenth aspect of the present invention, there is provided a player for reading data recorded on a recording medium having a plurality of data recording layers, the layers comprising at least a first recording layer and a second recording layer, the player comprising:

a reader for reading first data recorded on the first recording layer and second data which are recorded on the second recording layer and are relevant to the first data;

a decoder for decoding the first data;

a separation device for dividing the second data into first sample data sampled at a predetermined sampling cycle and second sample data which are sampled at the predetermined sampling cycle and chronologically differ from the first sample data;

an addition device for adding the first data decoded by the decoder to the first sample data divided by the separation device; and a synthesizer for merging into a single data set the data which are produced through addition by the addition device, and the second sample data which have been divided by the separation device.

So long as the first data are chronologically matched with the first sample data, the data which are produced through addition by the addition device can be made greater in the number of bits than the first data. Further, the data output from the addition device are added to the second sample data by the synthesizer, and hence there can be produced data whose number of samples is greater than that of the first data. Consequently, there can be played back data which are higher in quality and resolution than the first data.

According to an eighteenth aspect of the present invention, there is provided a player for reading data recorded on a recording medium having a plurality of data recording layers, the layers comprising at least a first recording layer and a second recording layer, the player comprising:

a reader for reading first data recorded on the first recording layer and second data which are recorded on the second recording layer and are relevant to the first data;

a decoder for decoding the first data;

a separation device for dividing the second data into predetermined frequency bands;

an addition device for adding the first data decoded by the decoder to the data of predetermined frequency band divided by the separation device; and a synthesizer for merging into a single data set the data which are produced through addition by the addition device, and the data of another frequency band divided by the separation device.

Since data of another frequency band are added to and merged with the first data, data which are higher in quality and resolution than the first data can eventually be played back.

According to a nineteenth aspect of the present invention, the player as defined in the sixteenth, seventeenth, or eighteenth aspect of the present invention is further characterized in that the relevant data complement the first data.

According to a twentieth aspect of the present invention, the player as defined in the nineteenth aspect of the present invention is further characterized in that the relevant data are intended to improve the quality of the first data.

According to a twenty-first aspect of the present invention, there is provided a player for reading data recorded on a recording medium having a plurality of data recording layers, the layers comprising at least a first recording layer and a second recording layer, the player comprising:

a reader for reading first data recorded on the first recording layer and second data which are recorded on the second recording layer and are relevant to the first data; and a conversion device which individually converts the first and second data read by the reader into analog signals.

As a result, the data recorded on the first recording layer and the data recorded on the second recording layer can be played back individually. So long as conventional CD data rare recorded on the first recording layer and high-quality, high-resolution data are recorded on the second recording layer, the only requirement for playing back the conventional CD data is to play back the data recorded on the first recording layer. In contrast, if higher-quality, higher-resolution data are to be played back, the only requirement is to play back the data recorded on the second recording layer.

According to a twenty-second aspect of the present invention, the player as defined in the twenty-first aspect of the present invention is further characterized in that the second data are higher in quality than the first data, and that the second data can be played back solely.

According to a twenty-third aspect of the present invention, the player as defined in the sixteenth, seventeenth, eighteenth, or twenty-first aspect of the present invention is further characterized in that the reader comprises a first optical pick-up for reading the first data, and a second optical pick-up for reading the second data.

According to a twenty-fourth aspect of the present invention, the player as defined in the sixteenth, seventeenth, eighteenth, or twenty-first aspect of the present invention is further characterized in that the reader comprises a single optical pick-up for reading the first and second data.

BRIEF DESCRIPTION OF THE DRAWINGS

FIG. 4 is a descriptive view for describing the relationship between recording densities and recording positions, wherein FIG. 4(a) is a descriptive view showing a case where data are recorded at different densities and at different positions; FIG. 4(b) is a descriptive view showing a case where data are recorded at the same density but at different positions; FIG. 4(c) is a descriptive view showing a case where data are recorded at different densities but at corresponding positions; and FIG. 4(d) is a descriptive view showing a case where data are recorded at the same density and at the corresponding positions;

BEST MODES FOR WORKING THE INVENTION

1. Optical Disk

Figure 1:
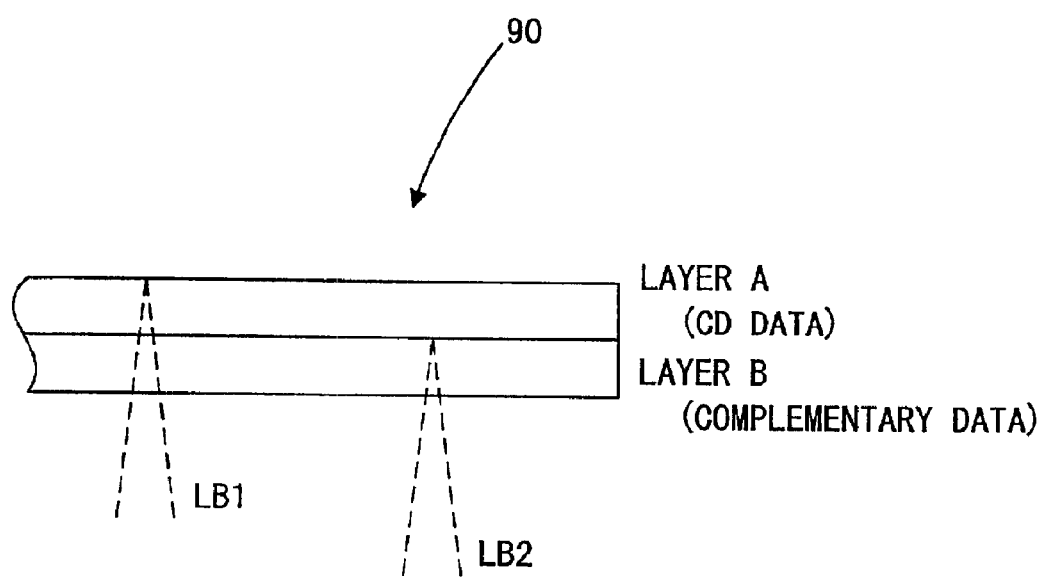
FIG. 1 is a schematic representation showing the cross-sectional structure of a preferred optical disk of the present invention.

An optical disk, which serves as a recording medium in the present invention, will now be described. FIG. 1 schematically shows the cross section of an optical disk 90 according to the present embodiment. As shown in FIG. 1 the optical disk 90 comprises layers A and B serving as signal recording layers. Audio information, which is information of interest, is recorded on the layer A as CD data. Complementary data which complement the data recorded on the layer A are recorded on the layer B. The information recorded on the layer A serves as first information, and the information recorded on the layer B serves as information relevant to the first information. The layer A, which serves as a first signal recording layer, and the layer B, which serves as a second signal recording layer, are provided on and in parallel within the optical disk 90. The contents of the CD data recorded on the layer A and those of the complementary data recorded on the layer B will be described later.

Figure 12:
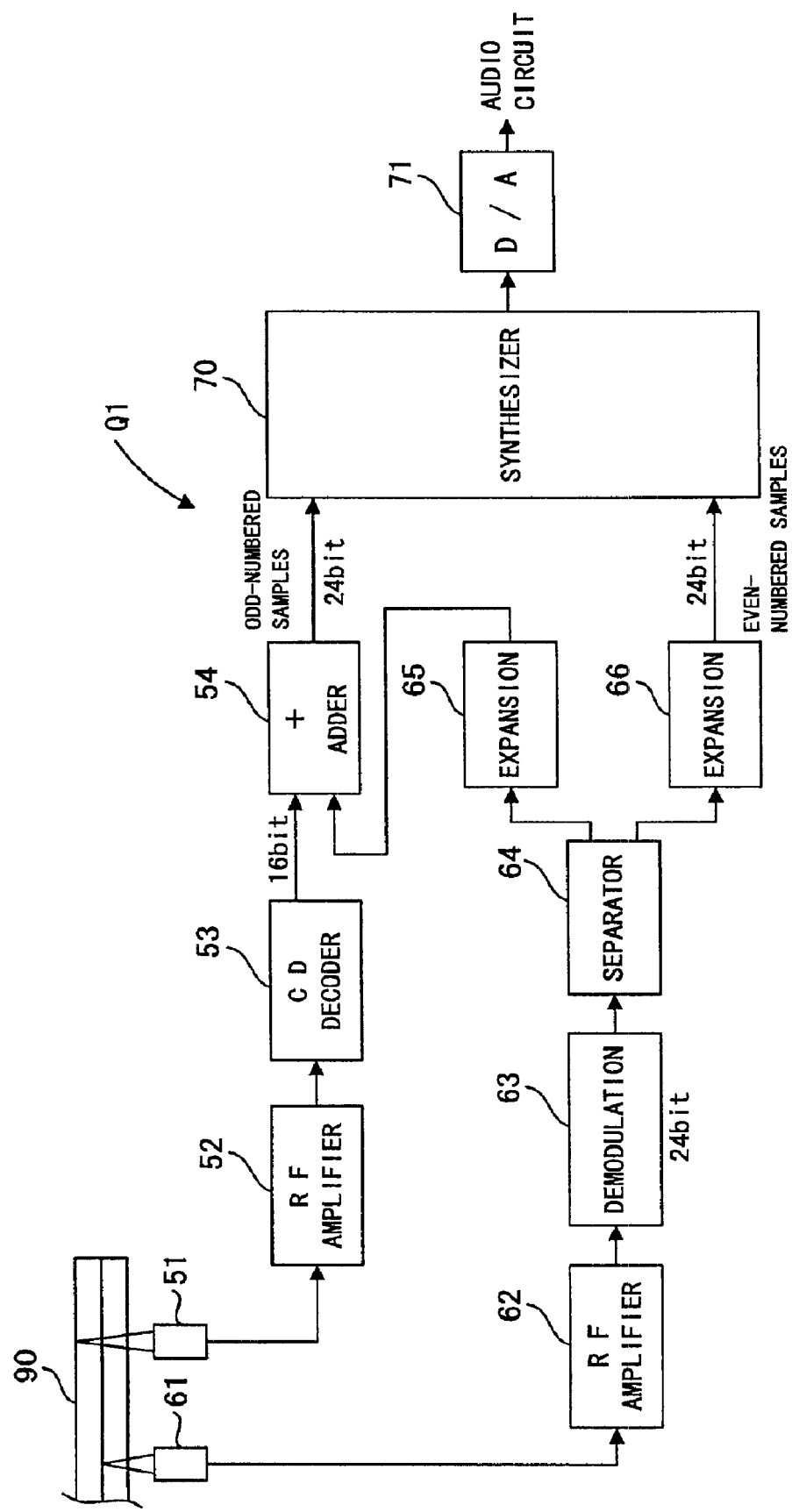
FIG. 12 is a block diagram showing a preferred playback circuit of the present invention.
Figure 13:
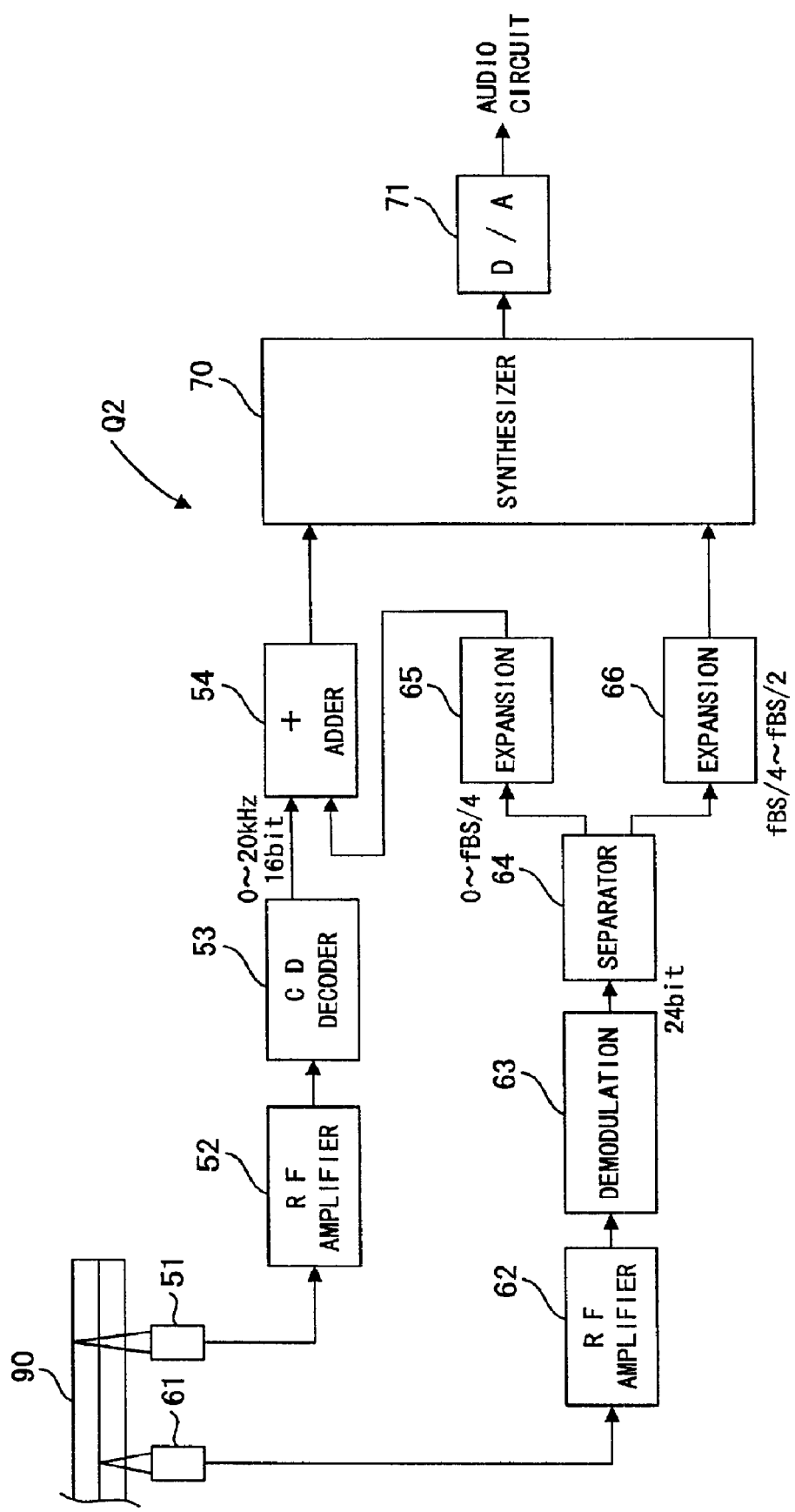
FIG. 13 is a block diagram showing another preferred playback circuit of the present invention.

To play back the data recorded on the optical disk 90, the data recorded on the layer A are read by means of a pick-up, and another pick-up is used for reading the data recorded on the layer B. As shown in FIGS. 12 and 13, the data recorded on the layer A are read by a laser beam LB1 output from a first optical pick-up 51, and the data recorded on the layer B are read by a laser beam LB2 output from a second optical pick-up 61. In one conceivable example, the optical pick-ups 51 and 61 may be provided at symmetrical positions with respect to the center of rotation of the optical disk 90. In this case, the CD data recorded on the layer A and the complementary data recorded on the layer B are preferably recorded at different positions. For example, a certain portion of the CD data is recorded at a certain position, and the corresponding portion of the complementary data is recorded at another position, so that the position of the CD data and the position of the complementary data are shifted from each other when viewed from the above.

As mentioned above, since the data recorded on the layer A are read by the first optical pick-up 51, the layer B is formed in the form of a reflection surface having such a degree of transmissivity as to permit transmission of a portion of the laser beam LB1. A playback circuit shown in FIG. 12 will be described in detail later.

In the example shown in FIG. 1, the CD data are recorded on the layer A, and the complementary data are recorded on the layer B. Conversely, the complementary data may be recorded on the layer A, and the CD data may be recorded on the layer B.

Further, as shown in FIG. 1, a portion of the CD data is recorded at a certain position on the surface of the optical disk 90, and a corresponding portion of the complementary data is recorded at another position so as to be shifted from the position of the CD data. The CD data are read by the laser beam LB1, and the complementary data are read by the laser beam LB2. The CD data and the corresponding complementary data may be recorded at corresponding positions on the surface of the optical disk 90, and the data may be read through use of a single optical pick-up which is arranged so as to output a double-focusing laser beam by use of, for example, a hologram. Here, corresponding positions on the surface of the optical disk 90 represent positions which appear to overlap each other, as viewed in the direction orthogonal to the surface of the optical disk 90. A player using such a single optical pick-up will be described later.

By reference to FIGS. 4(a) to 4(d), there will be described exemplary combinations of recording densities and recording positions; more specifically, exemplary combinations of the recording densities of the respective layers A and B of the two-layer optical disk and the recording positions on the disk surface; i.e., corresponding recording positions on the disk surface and different recording positions on the same. Here, the expression "corresponding data sets" means data sets which are to be merged into a single data set during playback. The corresponding data sets are represented by the relationship between a certain portion of the CD data and a corresponding portion of the complementary data.

Figure 2:
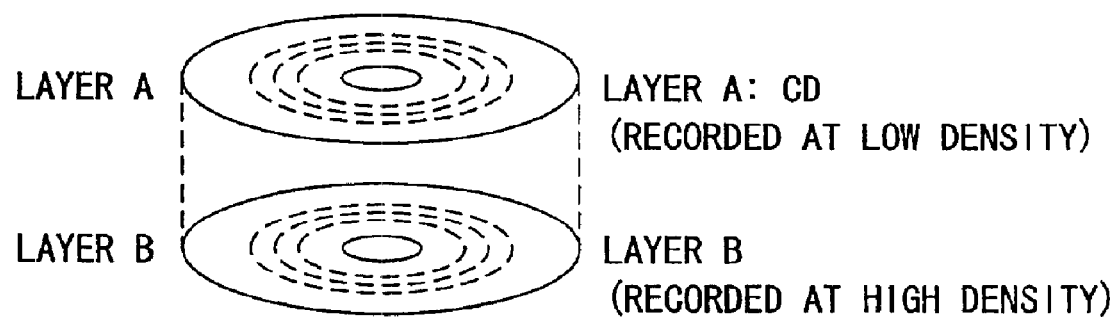
FIG. 2 is a descriptive view for describing the density at which data are recorded on the optical disk.

Two cases are conceivable; namely, a case where the layers have the same recording density, and a case where the layers differ in recording density. The recording density can be controlled by means of two factors; that is, the density of bits with respect to the direction of linear velocity, and a track pitch. The expression "layers that have the same recording density" signifies that the layers are identical with each other in terms of the density of bits with respect to the direction of linear velocity and in terms of track pitch. FIG. 2 schematically represents that the recording density of the layer A is lower than that of the layer B.

Figure 3:
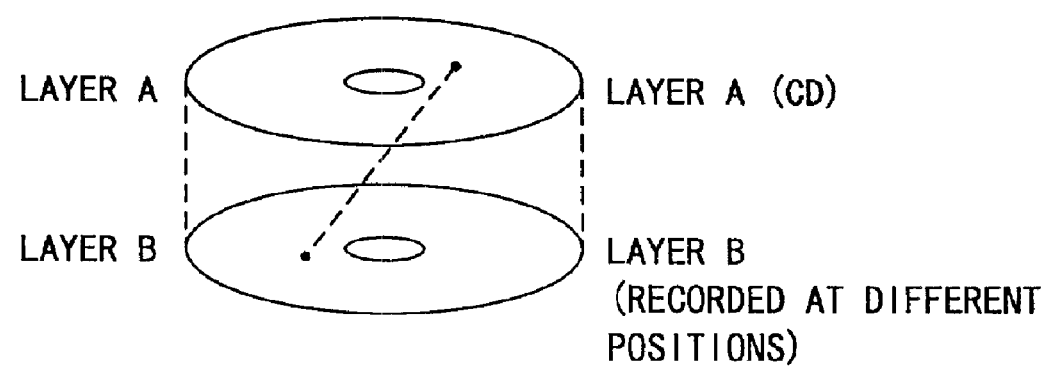
FIG. 3 is a descriptive view for describing positions on the optical disk at which data are recorded.

The expression "corresponding recording positions" means a chronological match between a portion of the CD data and a corresponding portion of the complementary data. A typical example of corresponding recording positions is a chronological match between the CD data recorded on the layer A and the complementary data recorded on the layer B. For example, if music data are taken as an example, corresponding recording positions indicate a case where a portion of music data and a corresponding portion of the complementary data overlap each other at any given point in time when viewed from the above. In this case, the music data can be played back through use of a single optical pick-up. FIG. 3 schematically shows a case where the position on the layer A where the CD data are recorded differs from the position on the layer B where the complementary data are recorded.

Figure 4:
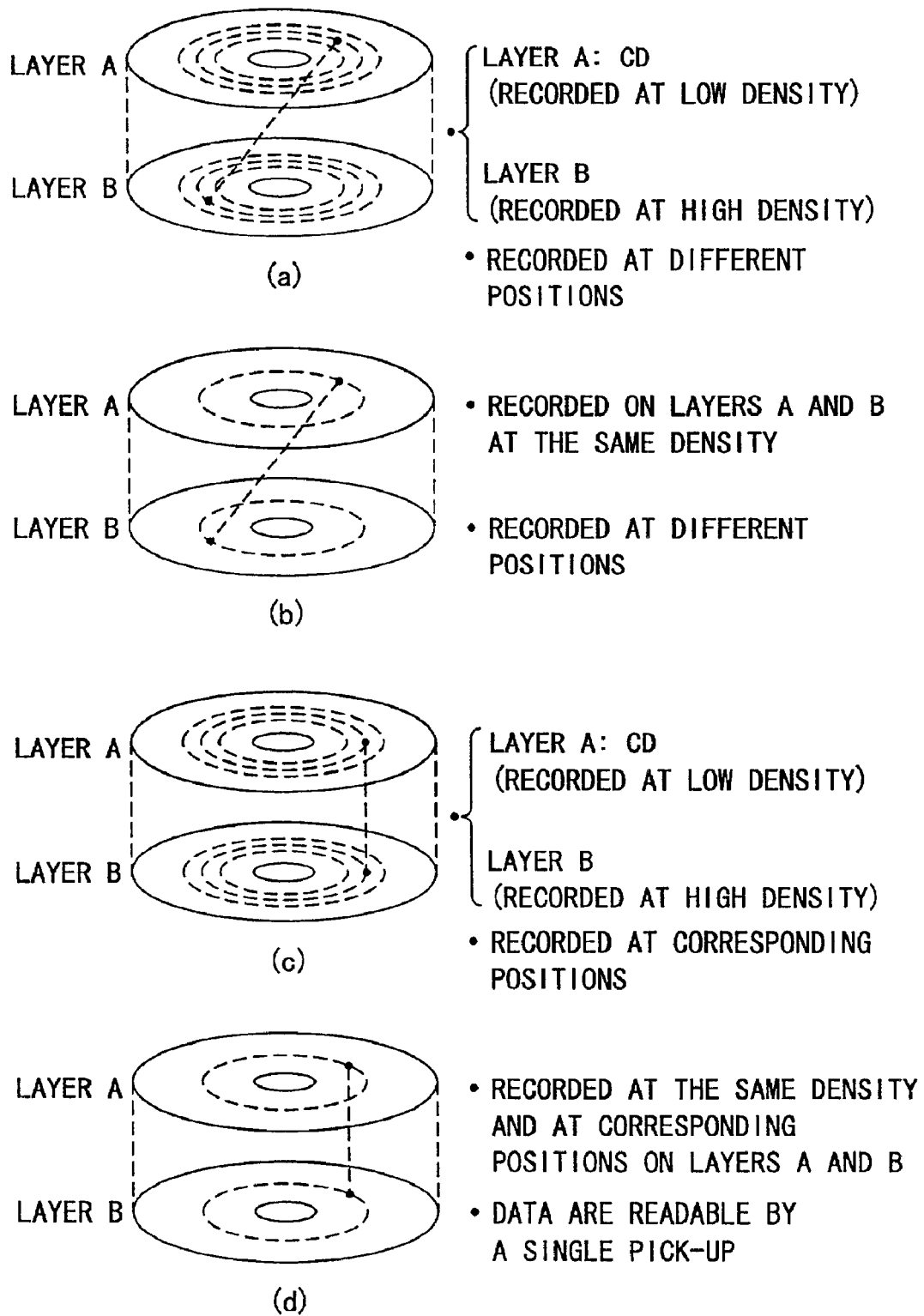

A first exemplary combination of recording densities and recording positions corresponds to a case where data are recorded on the layers A and B at different densities and at different positions on the surface of the optical disk, as schematically shown in FIG. 4(a). Since the data sets are recorded at different positions, the data are played back through use of a player equipped with two optical pick-ups. As will be described later, since the amount of data to be recorded on the layer B is greater than the amount of data to be recorded on the layer A, the recording density of the layer B is made greater than that of the layer A.

Data pertaining to the standard quality and resolution of sound which can be reproduced from solely the layer A may be recorded on the layer A. Similarly, data pertaining to the high-quality and high-resolution of sound which constitute the same selection as that recorded on the layer A and can be reproduced from solely the layer B may be recorded on the layer B. In other words, an optical disk may be configured on the premise that data recorded on the layer A and data recorded on the layer B are not merged into a single data set by means of simultaneous playback, and, in order to play back only the data recorded on the layer A or the data recorded on the layer B, the optical disk may be played back through use of a player equipped with a single optical pick-up. In this case, the amount of data to be recorded on the layer B is greater than the amount of data to be recorded on the layer A. If data are recorded on the layers A and B at the same density with respect to the direction of linear velocity but at different overall recording densities due to a difference in track pitch, the rotational speed of the optical disk required for playing back the data recorded on the layer B is faster than that required for playing back the data recorded the layer A.

A second exemplary combination of recording densities and recording positions corresponds to a case where data are recorded on the layers A and B at the same density and at different positions on the surface of the optical disk. In this case, since data are recorded at different positions, the data are played back through use of a player equipped with two optical pick-ups. Merging of corresponding data sets into a single data set involves control of timings of the corresponding data sets through use of a buffer. As will be described later, the amount of data to be recorded on the layer B is usually greater than the amount of data to be recorded on the layer A. Provided that the data are recorded on the layers A and B at the same density, the data are to be recorded at different positions. The second exemplary combination is schematically shown in FIG. 4(b).

A third exemplary combination of recording densities and recording positions corresponds to a case where data are recorded on the layers A and B at different densities and at corresponding positions on the surface of the optical disk. In this case, since data are recorded at corresponding positions, the data recorded on the layer A and the data recorded on the layer B differ in terms of density with respect to the direction of linear velocity. In a case where the amount of data to be recorded on the layer B is greater than the amount of data to be recorded on the layer A, the recording density with respect to the direction of linear velocity of the layer A differs from that of the layer B, and the amount of data to be recorded on the layer B becomes greater according to the direction of linear velocity. If the track pitch of the layer A differs from that of the layer B, recording positions on the layer A inevitably differ from those on the layer B. Hence, playback of the data through use of a single optical pick-up becomes difficult. The third exemplary combination, in which data are recorded at different densities but at corresponding positions, is schematically shown in FIG. 4(c).

A fourth exemplary combination of recording densities and recording positions corresponds to a case where data are recorded on the layers A and B at the same density and at corresponding positions on the surface of the optical disk. FIG. 4(d) shows the fourth exemplary combination. In this case, the data can be played back through use of a single optical pick-up configured so as to output a double-focusing laser beam by use of, for example, a hologram. In this case, the amount of data read from the layer A is the same as that of the data read from the layer B. Needless to say, the data can be read through use of two optical pick-ups.

2. Data Structure

Figure 5:
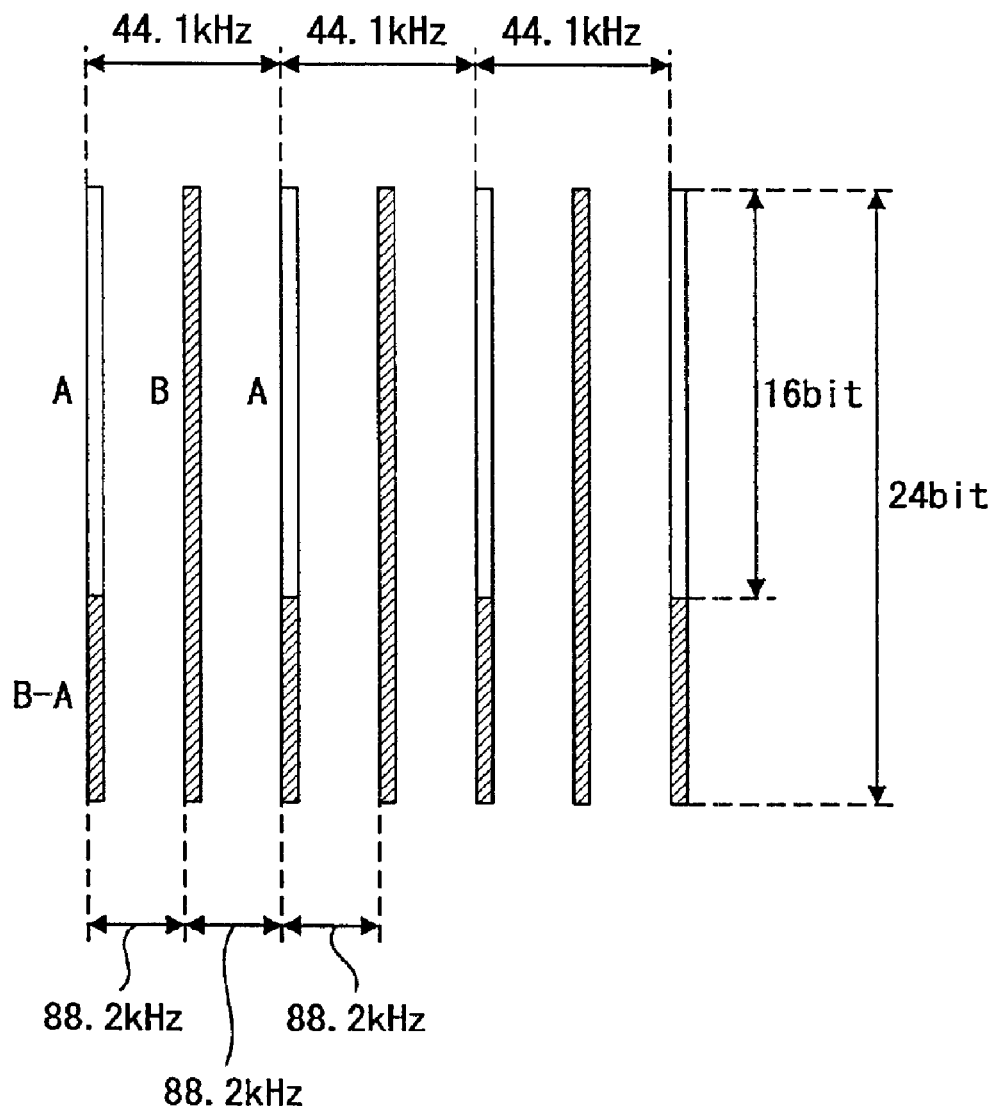
FIG. 5 is a descriptive view showing the structure of data recorded on respective recording layers of the optical disk.

The structure of the data stored in the layers A and B and the relationship between the CD data and the complementary data will now be described. FIG. 5 is a chart showing the relationship between the CD data and the complementary data.

In the conventional CD system, information of interest, such as music information, is sampled at a cycle of 44.1 kHz, and the respective thus-sampled values (sampled data sets) are quantized into 16-bit words. Thereafter, the 16-bit words are recorded after having been subjected to predetermined processing such as EFM MODULATOR. More specifically, in the drawing, 16-bit data corresponding to A (i.e., outlined slots) are recorded by means of the same processing as that performed in a conventional CD system. The information of interest is sampled at a cycle of 44.1 kHz, and the sampled values are quantized into 16-bit words. The thus-quantized 16-bit words are recorded after having been subjected to predetermined processing such as EFM MODULATOR. The 16-bit words are produced by quantizing each of the sampled values into 24-bit (or 20-bit) words and by re-quantizing the thus-quantized 24-bit words according to a known scheme. In the optical disk of the present embodiment, the 16-bit words designated by portions A are recorded on the layer A of the optical disk 90.

In contrast, differential data and 24-bit words are recorded on the layer B. The differential data correspond to a difference between the 16-bit words produced in the manner as mentioned above and the 24-bit words to be converted into 16-bit words through RE-QUANTIZATION CIRCUIT. In FIG. 5, the differential data are indicated by "B-A." Further, in FIG. 5, the differential data "B-A" are indicated by a diagonally-hatched short rod. This indication visually represents the concept "the substantial data complement data A." The differential data "B-A" can assume a size of 24 bits. More specifically, if 8 bits of 0 data are added to the lower half of the 16-bit words at the time of calculation of a difference, the resultant differential value assumes a size of 24 bits.

The 24-bit data correspond to the data resulting from quantization into 24-bit words of a value relating to the information of interest sampled at an intermediate time of a sampling cycle of 44.1 kHz. In FIG. 5, the 24-bit words correspond to a diagonally-hatched rod labeled by "B." The 24-bit words can be obtained by sampling the information of interest at a sampling cycle of 88.2 kHz and by extraction of the thus-sampled value at a time corresponding to the intermediate time of the sampling cycle of 44.1 kHz (the even-numbered rods from the left in FIG. 5). If information of interest is sampled at times "a," "c," "e," and "g" shown in FIG. 6 at the time of preparation of the data recorded on the layer A, the information is sampled at times "b," "d," and "f" and the samples are quantized into 24-bit words, whereby 24-bit data are obtained.

As mentioned above, the differential data labeled "B-A" in FIG. 5 and the 24-bit data labeled "B" are recorded on the layer B.

As mentioned above, the data structure is not limited to that mentioned previously. As mentioned previously, data pertaining to the standard quality and resolution of sound which can be reproduced from solely the layer A may be recorded on the layer A, and data pertaining to the high-sound-quality and high-resolution of sound which constitute the same selection as that recorded on the layer A and which can be reproduced from solely the layer B may be recorded on the layer B.

3. Recording Circuit

Next will be described a recording circuit (recorder) for producing the data shown in FIG. 5; more specifically, a recording circuit serving as a recorder of the present invention.

Figure 7:
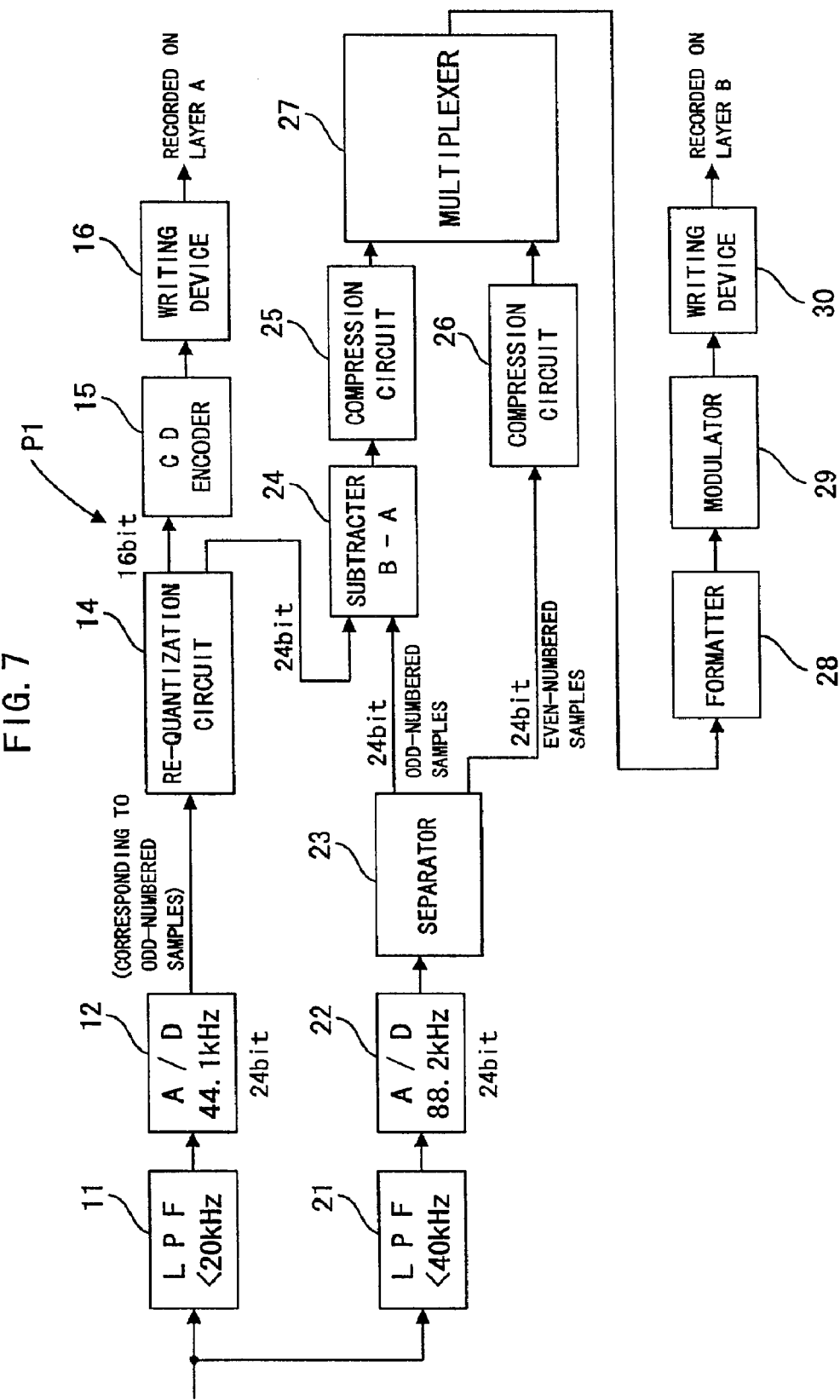
FIG. 7 is a block diagram showing a preferred recording circuit of the present invention.

As shown in FIG. 7, a recording circuit P1 having the first exemplary configuration comprises a low-pass filter 11; an analog-to-digital converter 12; a re-quantization circuit 14; a CD encoder 15; writing devices 16 and 30; a low-pass filter 21; an analog-to-digital converter 22; a separator 23; a subtracter 24; compression circuits 25 and 26; a multiplexer 27; a formatter 28; and a modulator 29.

Figure 6:
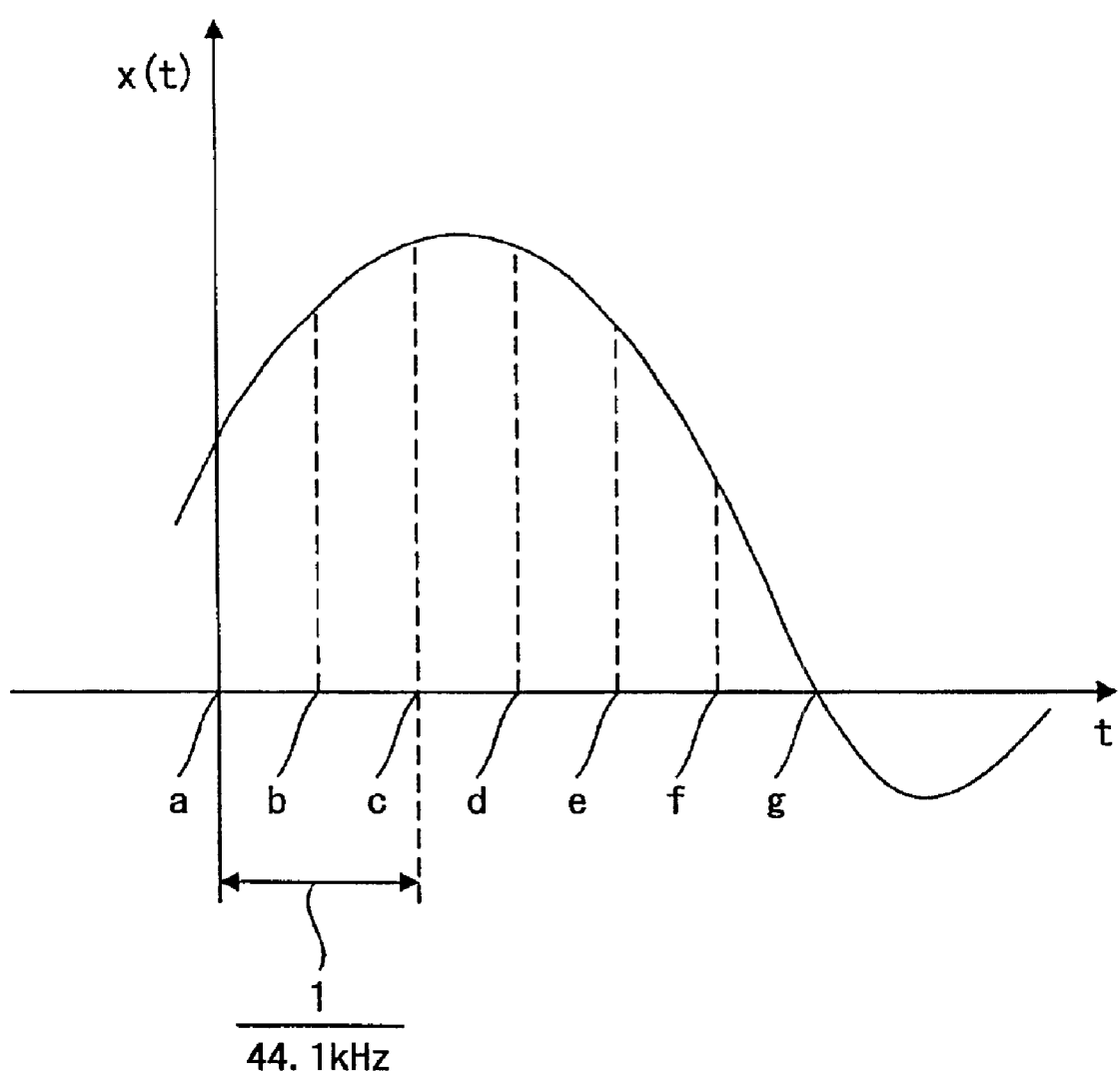
FIG. 6 is a descriptive view showing the structure of data recorded on respective recording layers of the optical disk.

In the recording circuit P1 having the above-described configuration, the data to be recorded on the layer A are produced in the same manner as are ordinary CD data. Information of interest input to the illustrated recording circuit P1, such as an audio signal, enters the low-pass filter 11, which permits passage of components whose frequencies are slightly lower than one-half a cycle $f_{BS}$ at which data to be recorded on the layer A are sampled. After components of the information whose frequencies exceed 20 kHz or thereabouts have been eliminated by the low-pass filter 11, the information signal is quantized by the analog-to-digital converter 12 into 24-bit words at a sampling cycle of 44.1 kHz. The data sampled at times "a," "c," "e," "g," . . . as shown in FIG. 6 are quantized into 24-bit words. The analog-to-digital converter 12 acts as a first data output device.

The 24-bit data are re-quantized into 16-bit data by means of the re-quantization circuit 14 and according to a known scheme. The 16-bit data are sent to the CD encoder 15, where the data are converted into CD-format data. The CD-format data are recorded on the layer A after having been subjected to predetermined processing performed by the writing device 16. The writing device 16 is constituted of a laser or a like device, as are any counterparts in the following exemplary configurations. The data recorded on the layer A correspond to the odd-numbered rods from the left in FIG. 5, which are labeled "A."

The 24-bit data, which are to be re-quantized into 16-bit data by the re-quantization device 14, are supplied to the subtracter (subtraction device) 24 and used for generating differential data "B-A" to be described later. The 24-bit data, which are fed to the subtracter 24 from the re-quantization device 14, may be generated by means of the re-quantization device 14 adding 8 bits of 0 data to the lower half of the 16-bit data supplied to the CD encoder 15 from the re-quantization device 14.

Data to be recorded on the layer B are produced through use of a sampling cycle which is double the sampling cycle to be used for producing ordinary CD data. Information of interest input to the illustrated recording circuit, for example, an audio signal, is divided and fed to the low-pass filter 21 and then to the circuitry for recording the data on the layer B. The low-pass filter 21 permits passage of components whose frequencies are lower than 40 kHz or thereabouts, which are slightly lower than one-half a cycle $f_{BS}$ at which data to be recorded on the layer B are sampled. After components of the information whose frequencies exceed 40 kHz or thereabouts have been eliminated by the low-pass filter 21, the information signal is quantized into 24-bit words by means of the analog-to-digital converter 22 at a sampling cycle of 88.2 kHz. The data sampled at times "a," "b," "c," "d," "e," "f," "g," . . . shown in FIG. 6 are quantized into 24-bit words. The analog-to-digital converter 22 acts as a second data output device, and the low-pass filters 11 and 21 act as filter devices. Further, the analog-to-digital converters 12 and 22 act as converters, as do any counterparts in the following exemplary configurations.

The 24-bit data output from the analog-to-digital converter 22 are divided into odd-numbered sampled data (odd-numbered sample data) and even-numbered sampled data (even-numbered sample data) by means of the separator 23, which acts as a separation device or a separator. The odd-numbered sample data correspond to the data to be recorded on the layer A and are represented by the odd-numbered rods from the left in FIG. 5. To this end, the analog-to-digital converters 12 and 22 are activated in synchronism with each other. The odd-numbered sample data and the even-numbered sample data will now be described by reference to FIG. 6. The data sampled at times "a," "c" "e," and "g" correspond to the odd-numbered sample data, and the data sampled at times "b," "d," and "f" correspond to the even-numbered sample data. The odd-numbered sample data are supplied to the subtracter 24, while the even-numbered sample data are supplied to the compression circuit 26. The even-numbered sample data, which are supplied to the compression circuit 26, correspond to the even-numbered rods from the left in FIG. 5, which are labeled "B."

The subtracter 24 computes differential data (B-A) which represent the difference between the odd-numbered sample data supplied from the separator 23 and the 24-bit data supplied from the re-quantization circuit 14. The differential data correspond to the odd-numbered rods from the left in FIG. 5, which are labeled "B-A." The differential data (B-A) are sent to the compression circuit 25, where the data are subjected to known compression processing. Here, re-quantization of 16-bit data into 24-bit data may be effected within the subtracter 24.

The even-numbered data output from the separator 23 are supplied to the compression circuit 26, where the data are subjected to known compression processing. As a result of calculation of differential data by means of the subtracter 24, high-sound-quality, high-resolution data can be produced by merging into a single data set the CD data recorded on the layer A and the differential data.

The compression circuits 25 and 26 are provided for diminishing the volume of data to be recorded. Particularly, the amount of data to be recorded on the layer B becomes greater than the amount of data to be recorded on the layer A. Therefore, the compression circuits 25 and 26 are necessary for recording the data at the same density and at corresponding positions. If the density at which data are recorded on the layer B can be made greater than that at which data are recorded on the layer A, recording of the data in corresponding positions can be effected merely by control of recording density. Therefore, in that case, the necessity for the compression circuits 25 and 26 may be obviated. The same applies to recording circuits, which will be described later.

The odd-numbered differential data that have been compressed by the compression circuit 25 and the even-numbered differential data that have been compressed by the compression circuit 26 are multiplexed by the multiplexer 27, which acts a multiplexing device. After the thus-multiplexed data have been formatted into a predetermined format by the formatter 28, the data are recorded onto the layer B after having been modulated by the modulator 29 according to a predetermined modulation scheme. The data are recorded on the layer B by means of the writing device 30. This writing device 30 is constituted of a laser or a like device, as are any counterparts in the following exemplary configurations. The formatter 28 adds control data to the multiplexed data.

In the recording circuit P1, the information of interest is filtered to a predetermined bandwidth (<20 kHz). The thus-filtered information is sampled at a predetermined sampling cycle (44.1 kHz) and is quantized into words having a predetermined number of bits (24 bits). The thus-quantized data are re-quantized to words whose number of bits is smaller than the predetermined number of bits (i.e., 16 bits) and are recorded on the layer A. In contrast, the information of interest is filtered to a bandwidth (i.e., <40 kHz), which is wider than the foregoing predetermined bandwidth. The thus-sampled information is sampled at a sampling cycle higher than the previously-described sampling cycle (i.e., 88.2 kHz) and is quantized to data having a predetermined number of bits (24 bits). The thus-quantized data are divided into the data sampled at predetermined times at a cycle of 44.1 kHz (e.g., odd-numbered samples) and the data sampled at different times (e.g., even-numbered samples). With regard to the data sampled at predetermined times, there is determined a difference between the data that have been quantized (i.e., the data output from the re-quantization circuit 14) and the data that have not yet been quantized (i.e., the odd-numbered sample data output from the separator 23). The differential data and the data sampled at a different time are multiplexed into a single data set, and the data are recorded on the layer B.

Figure 8:
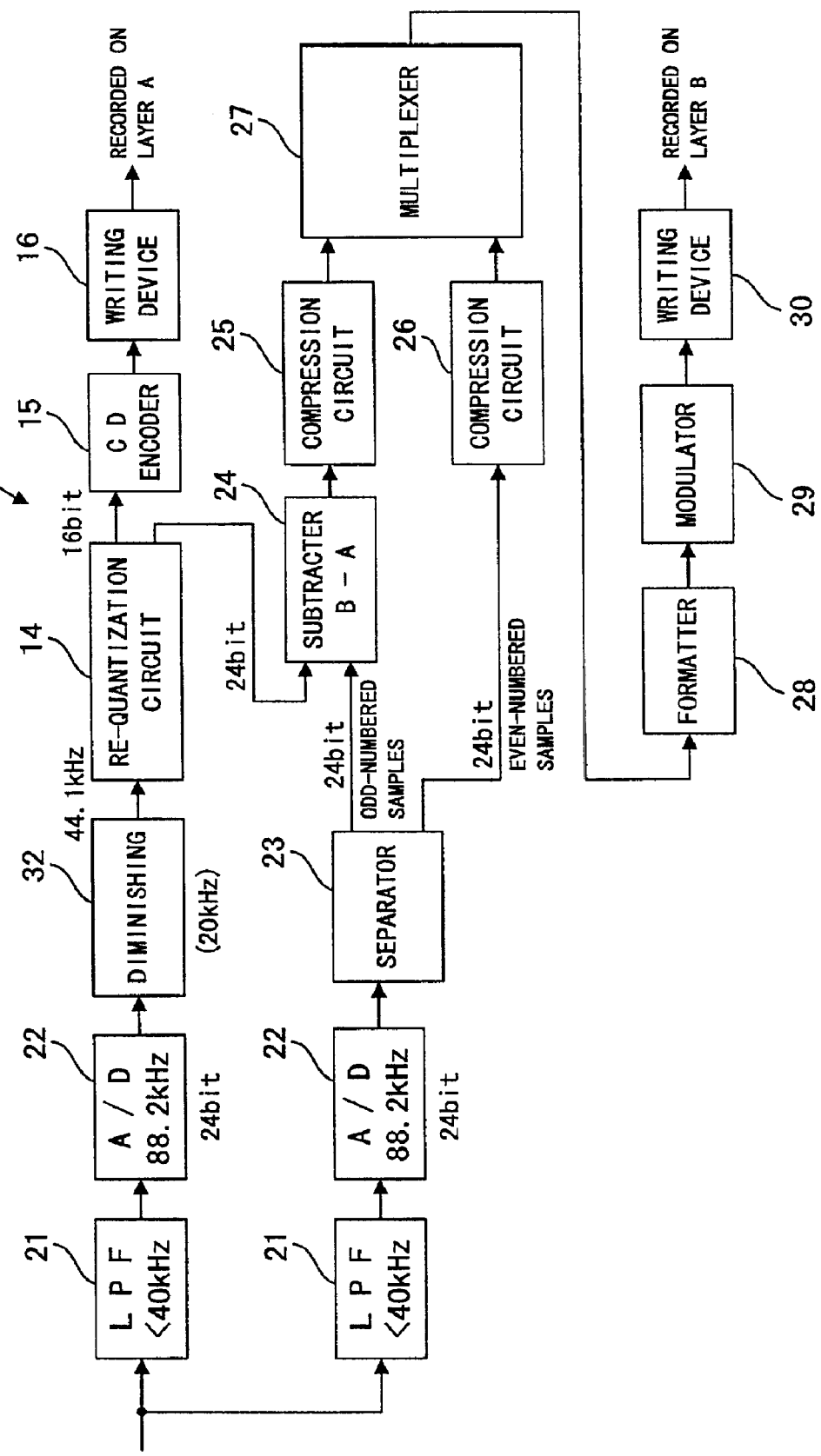
FIG. 8 is a block diagram showing another preferred recording circuit of the present invention.

Another exemplary configuration of the recording circuit will now be described. As shown in FIG. 8, a recording circuit P2 serving as a second example is substantially identical in structure with the recording circuit P1. The recording circuit P2 differs from the recording circuit P1 in that a sampling cycle of 88.2 kHz is used for generating data to be recorded on the layer A (CD data). The low-pass filter 21 for permitting passage of components of information having frequencies lower than 40 kHz or thereabouts is provided in the circuitry for producing the data to be recorded on the layer A; that is, circuits provided in the upper stage of the recording circuit P2, and the analog-to-digital converter 22 for sampling the thus-filtered information at a sampling cycle of 88.2 kHz and quantizing the thus-sampled data into 24-bit words is also provided. A diminishing circuit 32 serving as a diminishing device is provided in the circuitry for generating data to be recorded on the layer A, thus extracting one-half the samples. The diminishing circuit 32 diminishes the samples to one-half thereof, and performs filtering operations so as to permit passage of components whose frequencies are below 20 kHz or thereabouts. In this case, since the samples are diminished to one-half, the odd-numbered samples are not always output, in their present forms. In place of the low-pass filter 11 and the analog-to-digital converter 12 used in the recording circuit P1 of the first example, the low-pass filter 21, the analog-to-digital converter 22, and the diminishing circuit 13 are provided in the recording circuit P2. Since the second example is identical with the first example (shown in FIG. 7) in other respects, repetition of explanations of other elements is omitted here for brevity. As in the case of the recording circuit P1, after components of the information of interest whose frequencies exceed 40 kHz or thereabouts have been eliminated by the low-pass filter 21, the information is sampled by the analog-to-digital converter 22 at a sampling cycle of 88.2 kHz and is quantized to 24-bit words. The data output from the analog-to-digital converter 22 correspond to "data which are produced by limiting the bandwidth of data to be recorded to a predetermined bandwidth, sampling the data at a predetermined cycle, and quantizing the thus-sampled data to data having a predetermined number of bits."

In the recording circuit P2, the information of interest is filtered to a predetermined bandwidth (<40 kHz). The thus-filtered information is sampled at a predetermined sampling cycle (88.2 kHz) and is quantized into data having a predetermined number of bits (24 bits) (hereinafter will be referred to as "converted data"). The thus-quantized data are diminished and re-quantized to words whose number of bits is smaller than the predetermined number of bits (i.e., 16 bits), and are recorded on the layer A. In contrast, the converted data are divided into the data sampled at predetermined times at a cycle of 44.1 kHz (e.g., odd-numbered samples) and the data sampled at different times (e.g., even-numbered samples). With regard to the data sampled at predetermined times, there is determined a difference between the data that have been quantized (i.e., the data output from the re-quantization circuit 14) and the data that have not yet been quantized (i.e., the odd-numbered sample data output from the separator 23). The differential data and the data sampled at a different time are multiplexed into a single data set, and the data are recorded on the layer B. The analog-to-digital converter 22 and the diminishing circuit 32 provided for producing the data to be recorded on the layer A act as a first data output device, and the analog-to-digital converter 22 connected to the low-pass filter 21 acts as a second data output device.

In the first and second examples, only the data output from the subtracter 24 may be recorded on the layer B. Specifically, the compression device 26 and the multiplexer 27 are omitted from the circuit configurations shown in FIGS. 7 and 8, and only the differential data may be recorded on the layer B. As a result, the even-numbered sample data are prevented from being recorded on the layer B. Data, which are higher in sound quality and resolution than the data recorded on the layer A, can be produced by merging, during playback, the even-numbered data and the data recorded on the layer A into a single data set.

Conversely, only the data output from the separator 23 to the compression circuit 26 may be recorded on the layer B. Specifically, the subtracter 24, the compression circuit 25, and the multiplexer 27 are omitted from the configurations shown in FIGS. 7 and 8, and only the even-numbered sample data are recorded on the layer B. As a result, the differential data are prevented from being recorded on the layer B. Data, which are higher in sound quality and resolution than the data recorded on the layer A, can be produced by merging, during playback, the even-numbered data and the data recorded on the layer A into a single data set.

The circuit configuration shown in FIG. B is provided with the two low-pass filters 21 and the analog-to-digital converters 22. Alternatively, the circuit configuration may be provided with a single low-pass filter 21 and a single analog-to-digital converter 22. In such a case, the analog-to-digital converter 22 is connected to the low-pass filter 21, and the data output from the analog-to-digital converter 22 are input to the diminishing circuit 32 and the separator 23.

Figure 9:
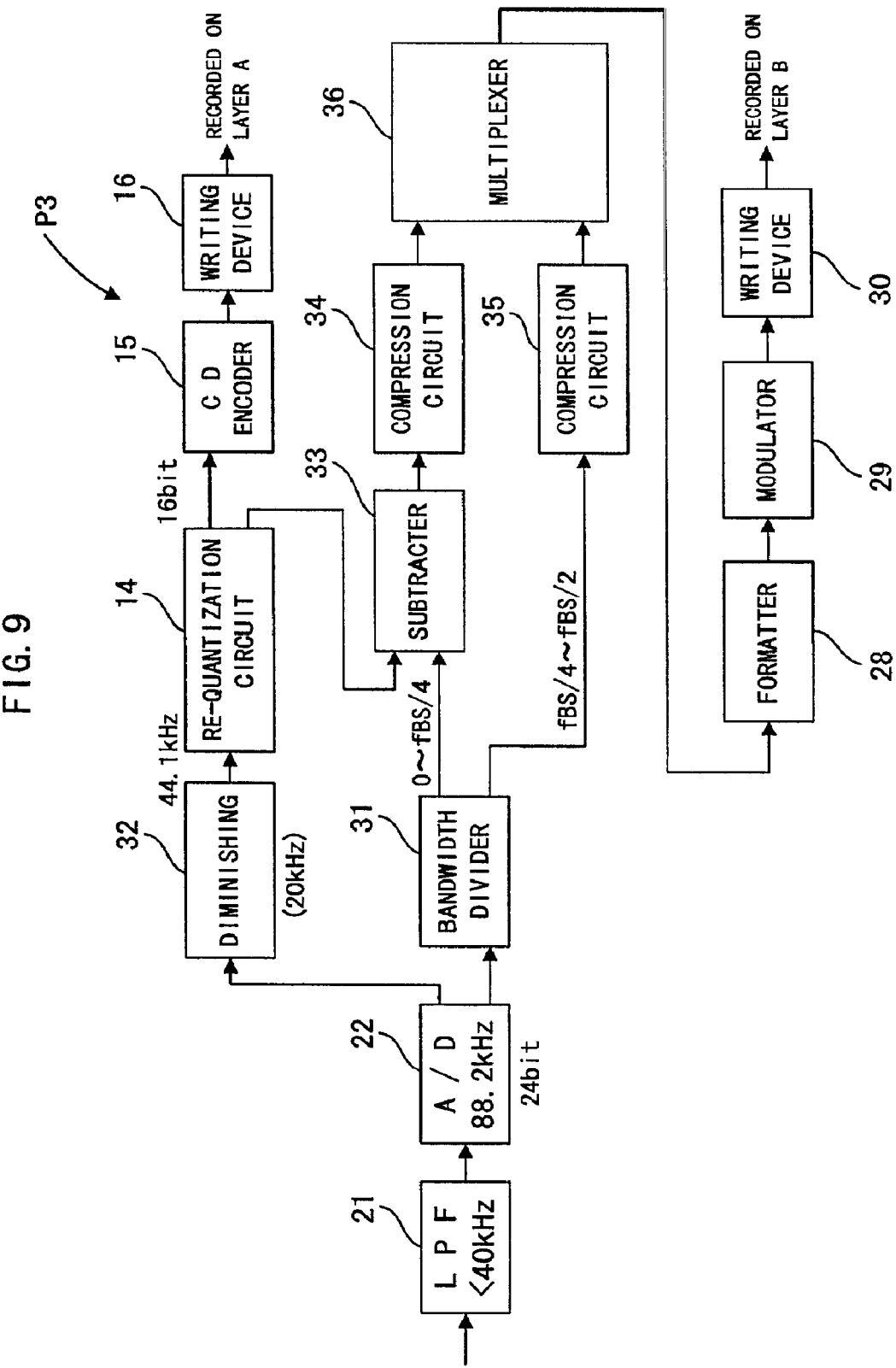
FIG. 9 is a block diagram showing still another preferred recording circuit of the present invention.

A recording circuit P3 shown in FIG. 9 serving as a third example is another example of configuration of the recording circuit for obtaining the data shown in FIG. 5. The recording circuit P3 comprises the low-pass filter 21; the analog-to-digital converter 22; the diminishing circuit 32; the re-quantization circuit 14; the CD encoder 15; the writing devices 16 and 30; the bandwidth divider 31; the subtracter 33; compression circuits 34 and 35; the formatter 28; and the modulator 29.

Information of interest input to the illustrated recording circuit P3, such as an audio signal, enters the low-pass filter 21, which permits passage of components whose frequencies are slightly lower than one-half a cycle $f_{BS}$ at which data to be recorded on the layer B are sampled. After components of the information whose frequencies exceed 40 kHz or thereabouts have been eliminated by the low-pass filter 21 (that is, after the bandwidth of the information has been limited), the information of interest is sampled and quantized by the analog-to-digital converter 22 into 24-bit words at a sampling cycle of 88.2 kHz.

The 24-bit data are delivered to the diminishing circuit 32 and the bandwidth divider 31 serving as a separation device.

The diminishing circuit 32 diminishes the samples to one-half thereof, and performs filtering operations so as to permit passage of components whose frequencies are below 20 kHz or thereabouts. The data output from the diminishing circuit 32 are sent to the re-quantization circuit 14. The re-quantization circuit 14 re-quantizes the 24-bit data into 16-bit data according to a known scheme. The 16-bit data are sent to the CD encoder 15, where the data are converted into CD-format data. The CD-format data are recorded on the layer A after having been subjected to predetermined processing performed by the writing device 16.

The 24-bit data, which are to be re-quantized into 16-bit data by the re-quantization device 14, are supplied to the subtracter 24 and subjected to subtraction processing to be described later. The 24-bit data, which are fed to the subtracter 24 from the re-quantization device 14, may be generated by means of the re-quantization device 14 adding 8 bits of 0 data to the lower half of the 16-bit data supplied to the CD encoder 15 from the re-quantization device 14.

The data, which the bandwidth divider 31 serving as a separation device receives from the analog-to-digital converter 22, are divided into data whose bandwidth ranges from 0 to $f_{BS}/4$ and data whose bandwidth ranges from $f_{BS}/4$ to $f_{BS}/2$.

The data whose bandwidth ranges from 0 to $f_{BS}/4$ are sent to the subtracter 33, where there are obtained a difference between the data sent from the re-quantization circuit 14 and the data sent from the bandwidth divider 31. The difference substantially corresponds to data whose bandwidth ranges from 20 kHz to 22.05 kHz. The data output from the re-quantization circuit 14 are based on the data that have been filtered to a bandwidth of 20 kHz or less by the diminishing circuit 32. In contrast, the data output from the bandwidth divider 31 correspond to data whose bandwidth ranges from 0 to $f_{BS}/4$; namely, data whose bandwidth ranges from 0 to 22.05 kHz. The differential data substantially correspond to data whose bandwidth ranges from 20 kHz to 22.05 kHz. Conversion of the 16-bit data, which are obtained through re-quantization, into 24-bit data may be performed within the subtracter 33.

The data output from the subtracter 33 are delivered to the compression circuit 34 and is compressed according to a known scheme. The data whose bandwidth ranges from $f_{BS}/4$ to $f_{BS}/2$ output from the bandwidth divider 31 are delivered to the compression circuit 35 and are compressed according to a known scheme. The data output from the compression circuit 34 and the data output from the compression circuit 35 are delivered to the multiplexer 36 and are multiplexed. After the thus-multiplexed data have been formatted into a predetermined format by the formatter 28, the data are modulated by the modulator 29 according to a given modulation scheme and are recorded on the layer B by means of the writing device 30.

The circuitry for recording data on the layer A provided in the recording circuit P3 is identical in structure with that provided in the recording circuit P2.

In the recording circuit P3, the information of interest is filtered to a predetermined bandwidth (<40 kHz). The thus-filtered information is sampled at a predetermined sampling cycle (88.2 kHz) and is quantized into data having a predetermined number of bits (24 bits) (hereinafter will be referred to as "converted data"). The thus-quantized data are diminished and re-quantized to words whose number of bits is smaller than the predetermined number of bits (i.e., 16 bits), and are recorded on the layer A. In contrast, the converted data are filtered to a predetermined bandwidth which corresponds to the product of the sampling frequency and the reciprocal of an integer. With regard to data having a certain bandwidth (0 to 22.05 kHz), there is determined a difference between the data having a certain bandwidth and the re-quantized data. The resultant differential data and data having another bandwidth (22.05 to 44.1 kHz) are multiplexed into a single data set and are recorded on the layer B.

As mentioned previously, the recording circuits P1, P2, and P3 can record, on the layers A and B of the optical disk 90, data having a structure such as that shown in FIG. 5. Conventional CD-format data are recorded on the layer A, and complementary data which complement the data recorded on the layer A are recorded on the layer B. High-quality, high-resolution data can be produced by merging into a single data set the CD-format data recorded on the layer A and the complementary data.

The exemplary configurations shown in FIGS. 8 and 9 can be applied to information of interest, such as a so-called digital master. In the exemplary configuration shown in FIG. 8, an analog signal is converted into a digital signal by means of the low-pass filter 21 and the analog-to-digital converter 22. In a case where a digital signal is used as information of interest, the information is input to the diminishing circuit 32 and the separator 23, in its present form. In the exemplary configuration shown in FIG. 9, an analog signal is converted into a digital signal by means of the low-pass filter 21 and the analog-to-digital converter 22. In a case where a digital signal is used as information of interest, the information is input to the diminishing circuit 32 and the bandwidth divider 31, in its present form.

Further, in the third exemplary configuration, only the data output to the compression circuit 34 from the subtracter 33 may be recorded on the layer B. In short, the compression circuit 35 and the multiplexer 36 are omitted from the configuration shown in FIG. 9, and only the differential data are recorded on the layer B. As a result, recording of, on to the layer B, data whose bandwidth ranges from $f_{a_{BS}}/4$ to $f_{BS}/2$ is omitted. However, so long as during playback the differential data are merged together with the data recorded on the layer A, there can be produced data which are higher in sound quality and resolution than those recorded on the layer A. In this case, the compression circuit 34 may be omitted.

Next will be described a recording circuit used for recording reproducible data on the layers A and B individually. In this case, CD data are recorded on the layer A, and on the layer B are recorded data whose contents are the same as those of the data recorded on the layer A; for example, data which are higher sound quality and resolution and pertain to the same selection as that pertaining to the data recorded on the layer A.

Figure 10:
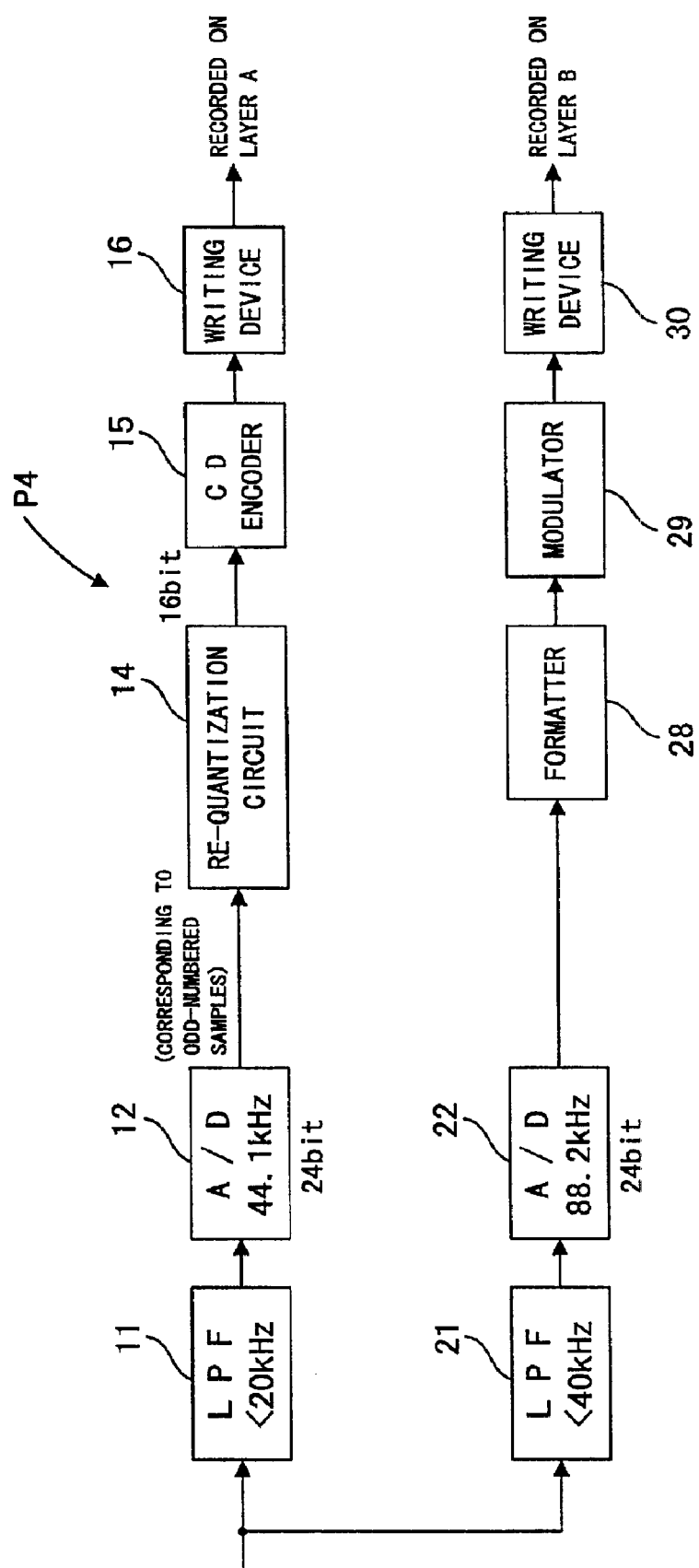
FIG. 10 is a block diagram showing yet another preferred recording circuit of the present invention.

As shown in FIG. 10, the recording circuit P4 comprises the low-pass filter 11, the analog-to-digital converter 12, the re-quantization circuit 14, the CD encoder 15, the writing devices 16 and 30, the low-pass filter 21, the analog-to-digital converter 22, the formatter 28, and the modulator 29. In other words, the recording circuit P4 is equal to the recording circuit P1 shown in FIG. 7, after removal of the separator 23, the subtracter 24, the compression circuits 25 and 26, and the multiplexer 27.

More specifically, recording of data on the layer A is effected by means of the following processing. Information of interest, such as music information, enters the low-pass filter 11, which permits passage of components whose frequencies are slightly lower than 20 kHz or thereabouts. After components of the information whose frequencies exceed 20 kHz or thereabouts have been eliminated by the low-pass filter 11, the information signal is quantized by the analog-to-digital converter 12 into 24-bit words at a sampling cycle of 44.1 kHz. The analog-to-digital converter 12 acts as a first data output device. The 24-bit data are re-quantized into 16-bit data by means of the re-quantization circuit 14 and according to a known scheme. The 16-bit data are sent to the CD encoder 15, where the data are converted into CD-format data. The CD-format data are recorded on the layer A after having been subjected to predetermined processing performed by the writing device 16.

Recording of data on the layer B is effected by means of the following processing. Information of interest is delivered to the low-pass filter 21 which permits passage of components whose frequencies are lower than 40 kHz or thereabouts. After components of the information whose frequencies exceed 40 kHz or thereabouts have been eliminated by the low-pass filter 21, the information signal is quantized into 24-bit words by means of the analog-to-digital converter 22 at a sampling cycle of 88.2 kHz. After the 24-bit data have been formatted into a predetermined format by means of the formatter 28, the data are modulated by the modulator 29 according to a predetermined scheme and are recorded on the layer B by means of the writing device 30.

Next will be described another exemplary configuration of the recording circuit used for recording reproducible data on the layers A and B individually.

Figure 11:
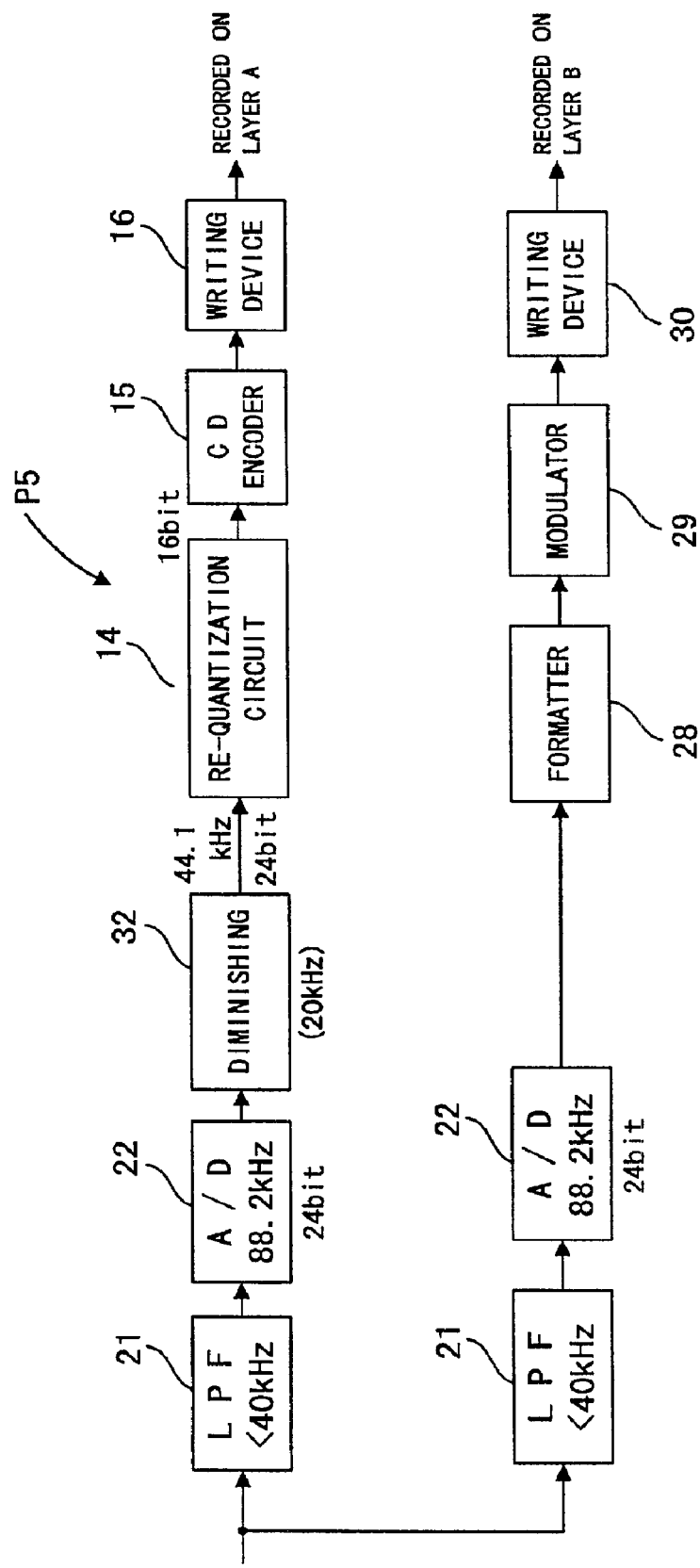
FIG. 11 is a block diagram showing still another preferred recording circuit of the present invention.

As shown in FIG. 11, the recording circuit P5 comprises the low-pass filter 21, the analog-to-digital converter 22, the diminishing circuit 32, the re-quantization circuit 14, the CD encoder 15, the writing devices 16 and 30, the low-pass filter 21, the analog-to-digital converter 22, the formatter 28, and the modulator 29. In other words, the recording circuit P5 is equal to the recording circuit P2 shown in FIG. 8 after removal of the separator 23, the subtracter 24, the compression circuits 25 and 26, and the multiplexer 27 or is equal to the recording circuit P3 shown in FIG. 9 after removal of the subtracter 33, the compression circuits 34 and 35, and the multiplexer 36.

More specifically, recording of data on the layer A is effected by means of the following processing. Information of interest, such as music information, enters the low-pass filter 21, which permits passage of components whose frequencies are slightly lower than 40 kHz or thereabouts. After components of the information whose frequencies exceed 40 kHz or thereabouts have been eliminated by the low-pass filter 21, the information signal is quantized by the analog-to-digital converter 12 into 24-bit words at a sampling cycle of 88.2 kHz. The 24-bit data are delivered to the diminishing circuit 32, the samples are diminished to one-half thereof. Further, the diminishing circuit 32 performs filtering operations so as to permit passage of components whose frequencies are below 20 kHz or thereabouts. The analog-to-digital converter 22 and the diminishing circuit 32 provided for recording data on the layer A act as a first data output device, and the analog-to-digital converter 22 connected to the low-pass filter 21 acts as a second data output device.

The data output from the diminishing circuit 32 are re-quantized into 16-bit data by the re-quantization circuit 14 according to a known scheme. The 16-bit data are sent to the CD encoder 15, where the data are converted into CD-format data. The CD-format data are recorded on the layer A after having been subjected to predetermined processing performed by the writing device 16.

Recording of data on the layer B is effected by means of the following processing. Information of interest is delivered to the low-pass filter 21 which permits passage of components whose frequencies are lower than 40 kHz or thereabouts. After components of the information whose frequencies exceed 40 kHz or thereabouts have been eliminated by the low-pass filter 21, the information signal is quantized into 24-bit words by means of the analog-to-digital converter 22 at a sampling cycle of 88.2 kHz. After the 24-bit data have been formatted into a predetermined format by means of the formatter 28, the data are modulated by the modulator 29 according to a predetermined scheme and are recorded on the layer B by means of the writing device 30.

The circuit configuration shown in FIG. 11 is provided with the two low-pass filters 21 and the analog-to-digital converters 22. Alternatively, the circuit configuration may be provided with a single low-pass filter 21 and a single analog-to-digital converter 22. In such a case, the analog-to-digital converter 22 is connected to the low-pass filter 21, and the data output from the analog-to-digital converter 22 are input to the diminishing circuit 32 and the formatter 28.

As mentioned above, data which can be reproduced solely from the layer A and which have standard sound quality and resolution are recorded on the layer A. Data which can be reproduced solely from the layer B and have high-sound-quality and resolution are recorded on the layer B. Thus, data can be recorded on the layers A and B individually.

The exemplary configuration shown in FIG. 11 can be applied to information of interest, such as a so-called digital master. In the exemplary configuration shown in FIG. 11, an analog signal is converted into a digital signal by means of the low-pass filter 21 and the analog-to-digital converter 22. In a case where a digital signal is used as information of interest, the information is input to the diminishing circuit 32 and the formatter 28, in its present form.

In the recording circuits P4 and P5, a compression circuit may be interposed between the analog-to-digital converter 22 and the formatter 28.

In the previous descriptions, the respective recording circuits have been described so as to process information of interest in the form of an analog signal after the analog signal has been converted into a digital signal but the recording circuits of the present invention are not limited to such a configuration; the information of interest may be processed in the form of an analog signal.

4. Playback Circuit

Next will be described the configuration of a playback circuit (player) for playing back the data which have been recorded on the optical disk 90 in the previously-described manner; that is, a playback circuit serving as a player of the present invention.

As shown in FIG. 12, a playback circuit Q1 comprises a first optical pick-up 51; RF amplifiers 52 and 62; a CD decoder 53; an adder 54; a second optical pick-up 61; a demodulator 63; a separator 64; expansion circuits 65 and 66; a synthesizer 70, and a digital-to-analog converter 71. The playback circuit Q1 plays back the data recorded by the recording circuit P1 shown in FIG. 7 and the data recorded by the recording circuit P2 shown in FIG. 8.

The first optical pick-up 51 reads the data recorded on the layer A. The data read from the layer A by the first optical pick-up 51 are delivered from the RF amplifier 52 to the CD decoder 53 serving as a decoder, where the data are decoded into 16-bit data. The thus-decoded data are sent to an adder 54.

The second optical pick-up 61 reads the data from the layer B. The data read from the layer B by the second optical pick-up 61 are sent from the RF amplifier 62 to a demodulator 63, which matches the original modulation scheme, and the data are demodulated into high-resolution 24-bit data. The thus-demodulated data are delivered to a separator (separation circuit) 64 serving as a separation device. The separator 64 divides the 24-bit data into data corresponding to the odd-numbered sample data and data corresponding to the even-numbered sample data. In other words, the 24-bit data are divided into data corresponding to the data which are sampled at a cycle of 44.1 kHz and are to be recorded on the layer A, and data used for complementing the data. Of the data divided by the separator 64, the data corresponding to the odd-numbered sample data correspond to the data which are prepared by means of the compression circuit 25 compressing the data that have been subjected to subtraction processing in the subtracter 24 (see FIGS. 7 and 8). Further, of the data separated by the separator 64, the data corresponding to the even-numbered sample data correspond to the data that have been prepared by means of the compression circuit 26 compressing the even-numbered sample data output from the separation circuit 23. The first optical pick-up 51 and the second optical pick-up 61 act as reading devices.

The data corresponding to the odd-numbered sample data are sent to the expansion circuit 65, where the data are subjected to predetermined expansion processing corresponding to the compression processing. The thus-processed data are sent to the adder 54. The adder 54 adds the data output from the CD decoder 53 to the data that have been subjected to expansion processing by the expansion circuit 65. The data output from the CD decoder 53 are 16-bitwords, whereas the data output from the expansion circuit 65 are 24-bit words. In fact, addition of data is performed by adding 8 bits of 0 zero data to the lower half of the 16-bit data output from the CD decoder 53. In other words, the adder 54 converts 16-bit CD data into higher-resolution data. These data sets are chronologically matched by means of unillustrated buffers or like devices.

Of the data divided by the separator 64, the data corresponding to the even-numbered sample data are subjected to the synthesizer 70, which serves as a synthesizing device, after having been subjected to expansion processing by the expansion circuit 66.

The synthesizer 70 merges into a single data set the high-resolution CD data output from the adder 54 and the sample complementary CD data output from the expansion circuit 66. More specifically, the 24-bit odd-numbered sample data output from the adder 54 and the even-numbered sample data output from the expansion circuit 66 are merged into a single data set. The resultant data set is converted into an analog signal by the digital-to-analog converter 71 and is sent to a known audio circuit.

Of the playback circuit shown in FIG. 12, the circuitry following the RF amplifier 52 and the circuitry following the RF amplifier 62 act as data generation devices.

In FIG. 12, the expansion circuits 65 and 66 are provided so as to correspond to the compression circuits provided in the recording circuit. If no compression circuits are provided in the recording circuit, the necessity for expansion circuits may be obviated. In the player whose playback circuit Q1 is shown in FIG. 12, the circuitry for driving the optical disk 90 and the circuitry for driving the optical pick-ups 51 and 61 are the same as those provided in the conventional CD player. Hence, they are omitted from the drawings, and repetition of description of such circuitry is omitted.

In a case where only the differential data are recorded on the layer B and recording of the even-numbered sample data is omitted, naturally playback of the recorded data does not require the expansion circuit 66 or the synthesizer 70. In contrast, in a case where only the even-numbered data are recorded on the layer B and recording of the differential data is omitted, naturally playback of the recorded data does not require the adder 54 or the expansion circuit 65.

A playback circuit Q2, such as that shown in FIG. 13, is employed for playing back the data recorded by the recording circuit, such as the recording circuit P3 which is shown in FIG. 9 and records data by dividing the data according to bandwidth.

The playback circuit Q2 is substantially equal in configuration to the playback circuit Q1. The data read from the layer B are demodulated by the demodulator 63 and are divided into the data whose bandwidth ranges from 0 to $f_{BS}/4$ and the data whose bandwidth ranges from $f_{BS}/4$ to $f_{BS}/2$, by means of the separator (separation circuit) 73. The data whose bandwidth ranges from 0 to $f_{BS}/4$ are sent to the expansion circuit 65, and the data whose bandwidth ranges from $f_{BS}/4$ to $f_{BS}/2$ are sent to the expansion circuit 66. The adder 54, which serves as an adding device, adds the data output from the CD decoder 53 to the data output from the expansion circuit 65. The data output from the CD decoder 53 are data whose bandwidth ranges from 0 to 20 kHz, and the data output from the expansion circuit 65 are data whose bandwidth ranges from 0 to $f_{BS}/4$ (22.05 kHz); substantially, data whose bandwidth ranges from 20 kHz to 22.05 kHz. Consequently, the data whose bandwidth ranges from 0 to 20 kHz and the data whose bandwidth ranges from 20 kHz to 22.05 kHz are added together. In short, the data are subjected to merging of bandwidths. As in the case of the playback circuit Q1, the data output from the CD decoder 53 are 16-bit words, and the data output from the expansion circuit 65 are 24-bit words. In fact, addition of the data is effected by addition of, for example, 8 bits of 0 data to the lower half of the 16-bit data output from the CD decoder 53.

The data output from the adder 54 and the data output from the expansion circuit 66 are merged into a single data set, by means of the synthesizer 70. In short, the data are subjected to merging of bandwidths. The data output from the synthesizer 70 are sent to the audio circuit from the digital-to-analog converter 71, where the data are played back.

In a case where only the differential data output from the subtracter 33 (see FIG. 9) are recorded on the layer B and recording of the data whose bandwidth ranges from $f_{BS}/4$ to $f_{BS}/2$ has been omitted, naturally playback of the recorded data does not require the expansion circuit 66 or the synthesizer 70.

The playback circuit shown in FIGS. 12 and 13 is equipped with two optical pick-ups. As mentioned above, if data are recorded in corresponding positions, the playback circuit may be equipped with a single optical pick-up.

Figure 14:
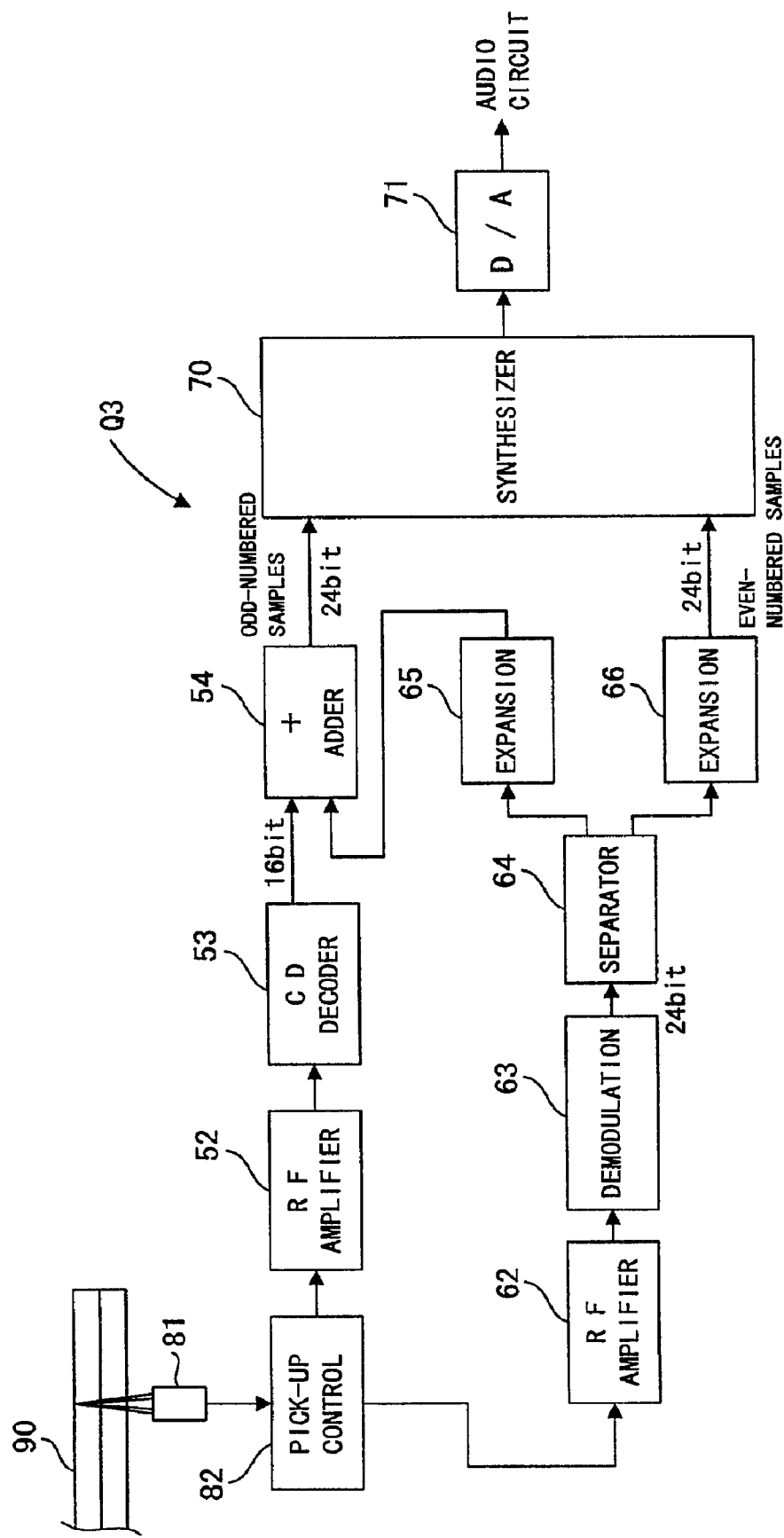
FIG. 14 is a block diagram showing still another preferred playback circuit of the present invention.

In a case where the playback circuit Q1 shown in FIG. 12 is provided with a single optical pick-up, the playback circuit Q1 becomes equal to the playback circuit Q3 shown in FIG. 14. The playback circuit Q3 is provided with a single optical pick-up 81 which is arranged so as to be able to output a double-focusing laser beam through use of, for example, a hologram. In other words, the focal length of a single laser beam can be controlled. The pick-up control circuit 82 performs control of the focal length; that is, control of the optical pick-up and switching between outputs. In other respects, the playback circuit Q3 is identical in configuration with the playback circuit Q1, and hence repetition of their explanations is omitted here for brevity.

Figure 15:
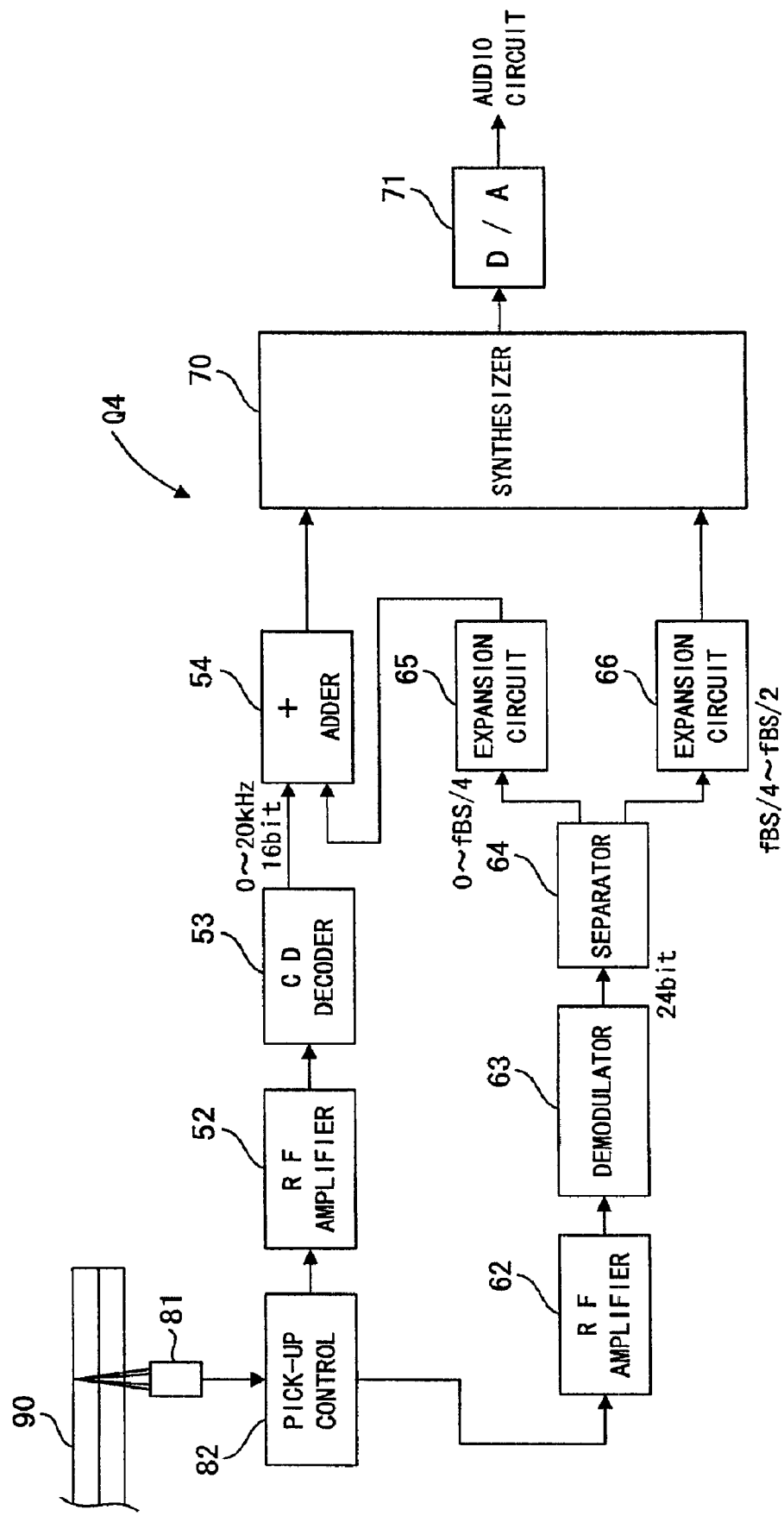
FIG. 15 is a block diagram showing yet another preferred playback circuit of the present invention.

In a case where the optical pick-ups of the playback circuit Q2 shown in FIG. 13 are formed into a single optical pick-up, the playback circuit Q2 becomes equivalent to the playback circuit Q4 shown in FIG. 15. The playback circuit Q4 is provided with a single optical pick-up 81 which can output a double-focusing laser beam through use of a hologram or a like element. In short, the single optical pick-up 81 is configured so as to be able to control the focal length of a single laser beam. The pick-up control circuit 82 performs control of the focal length; that is, control of the optical pick-up and switching between outputs. In other respects, the playback circuit Q3 is identical in configuration with the playback circuit Q1, and hence repetition of their explanations is omitted here for brevity.

Next will be described a playback circuit to be used in a case where individually-reproducible data are recorded on the layer A, as well as on the layer B.

Figure 16:
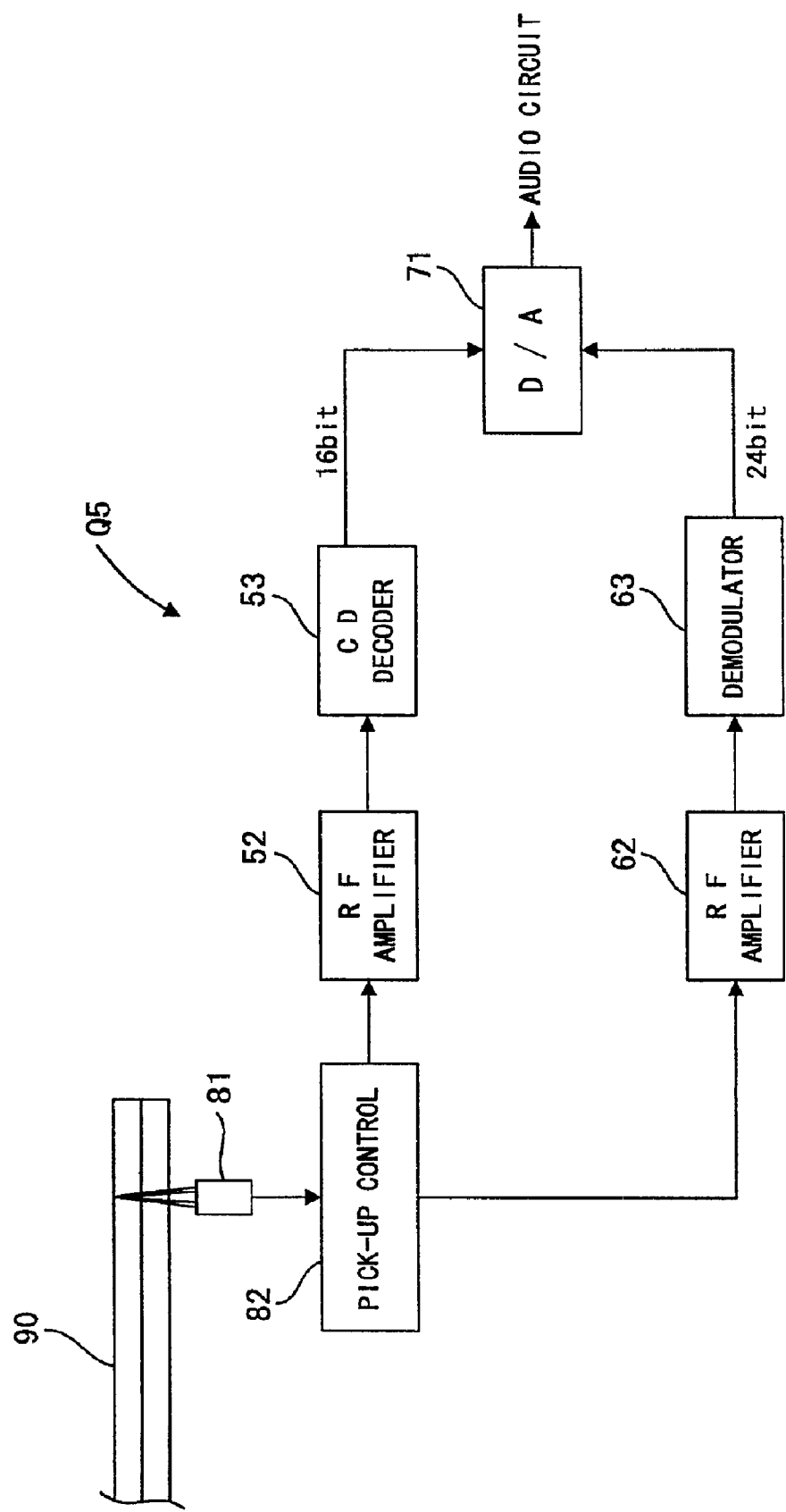
FIG. 16 is a block diagram showing still another preferred playback circuit of the present invention.

As shown in FIG. 16, a playback circuit Q5 comprises the optical pick-up 81; the pick-up control circuit 82; the RF amplifier 52; the CD decoder 53; the RF amplifier 62; the demodulator 63; and a digital-to-analog converter 83.

The optical pick-up 81 can output a double-focusing laser beam through use of a hologram or a like element. In short, the single optical pick-up 81 is configured so as to be able to control the focal length of a single laser beam. The pick-up control circuit 82 performs control of the focal length; that is, control of the optical pick-up and switching between outputs.

Playback of the data recorded on the layer A will now be described. The data—which have standard sound quality and resolution and can be played back solely—are recorded on the layer A. The optical pick-up 81 is controlled by the pick-up control circuit 82 so as to read the data recorded on the layer A, and the data read from the layer A are sent to the RF amplifier 52 by way of the pick-up control circuit 82, so that the data are amplified by the RF amplifier 52. The thus-amplified data are sent to the CD decoder 53, where the data are decoded into 16-bit data. The thus-decoded data are converted into an analog signal by the digital-to-analog converter 83, and the thus-converted analog signal is sent to a known audio circuit. This analog-to-digital converter 83 acts as a conversion device for converting the first and second data into analog signals individually. The data recorded on the layer A correspond to the first data, and the data recorded on the layer B correspond to the second data.

Next will be described playback of the data recorded on the layer B. The data—which are of high quality and high resolution and can be played back solely—are recorded on the layer B. The optical pick-up 81 is controlled by the pick-up control circuit 82 so as to read the data recorded on the layer A, and the data read from the layer B are sent to the RF amplifier 62 by way of the pick-up control circuit 82, so that the data are amplified by the RF amplifier 62. The thus-amplified data are sent to the demodulator 63, where the data are demodulated into 24-bit high-resolution data according to a demodulation scheme corresponding to the original modulation scheme. The thus-demodulated data are sent to a known audio circuit after having been converted into an analog signal by the digital-to-analog converter 83.

As mentioned above, the playback circuit Q3 having the playback circuits for the layers to be played back can play back data if reproducible data have been recorded on the layers A and B individually.

In the optical disk on which data are recorded in such a manner as mentioned above, ordinary CD data are recorded on the layer A. hence, a conventional CD player can play back data from only the layer A.

Although the embodiments of the present invention have been described, the present invention is not limited to these embodiments. Needless to say, the present invention can be susceptible to various modifications within the technical scope of the present invention. For example, although the previous embodiments have described the present invention while a CD is taken as an example and an optical disk is taken as an example of a recording medium, the present invention can be applied to various types of recording media having a recording layer, such as a drum or a tape, as well as to disks such as magnetic disks, digital video disks, or like disks. Further, any available compression scheme may be used as the scheme for compressing audio data.

Further, although the present invention has been described by reference to a recording medium having two recording layers, layer A and layer B, serving as signal recording layers, the present invention is not limited to such a recording medium and maybe applied to a recording medium having three or more recording layers.

Further, although the present invention has been described while music information (audio data) is taken as an example of information of interest, another type of information may also be used as the information of interest.

As has been described above, a recording medium of the present invention enables production of high-quality, high-resolution data by merging into a single data set during playback relevant data recorded on a single signal recording layer and first data recorded on another signal recording layer. Even in a case where the relevant data are recorded as data-which can be solely reproduced and are higher in quality and resolution than the first, the recording medium enables production of high-quality, high-resolution data. For example, in a case where conventional CD data are taken as the first data, the relevant data can be played back as data which are higher in quality and resolution than the CD data. Alternatively, ordinary CD data can be played back, so long as ordinary CD data are recorded as the first data.

So long as information of interest is recorded on the recording medium by the recorder of the present invention, the information can be played back as higher-quality, higher-resolution information during playback. If information to be recorded on a single signal recording layer is recorded as ordinary CD data, the information can be played back through use of a conventional CD player.

The player of the present invention can play back information which is higher in quality and resolution than the first data recorded on the first recording layer. In a case where conventional CD data are taken as the first data, the data can be played back as data which are higher in quality and resolution than the conventional CD data.

What is claimed is:

1. A recorder for recording data on a recording medium, comprising:

a first data output device which outputs sample data, the sample data being formed by sampling information to be recorded at a given cycle and quantizing the thus-sample data into data having a predetermined number of bits;

a re-quantization device which re-quantizes the data output from the first data output device into data whose number of bits is smaller than the predetermined number of bits;

a first writing device which records, at a predetermined recording density, data on a predetermined recording layer of the recording medium on the basis of the data, which has been re-quantized by the re-quantization device;

a second data output device which outputs data, the data being produced by sampling the information to be recorded at a cycle shorter than the predetermined cycle and quantizing the thus-sampled information into data having a predetermined number of bits;

a separation device for dividing the data output from the second data output device into a plurality of sample data sets which have been sampled at the predetermined cycle and at different times;

a subtraction device which calculates a difference between the data output from the re-quantization device and the predetermined sample data output from the separation device;

a multiplexing device which multiplexes into a single data set the data output from the subtraction device and the sample data, which are output from the separation device but differ from the predetermined sample data; and a second writing device for recording data on the recording layer of the recording medium on the basis of the data, which have been multiplexed by the multiplexing device, at a recording density higher than that at which the first writing device records data.

2. A recorder for recording data on a recording medium, comprising:

a filtering device which limits the bandwidth of information to be recorded to a predetermined frequency bandwidth;

a conversion device which samples the data output from the filtering device at a predetermined cycle and quantizes the thus-sampled data into data having a predetermined number of bits;

a diminishing device which performs a diminishing operation on the data output from the conversion device;

a re-quantization device which re-quantizes the data output from the diminishing device into data whose number of bits is smaller than the predetermined number of bits;

a first writing device which records, at a predetermined recording density, data on a predetermined recording layer of the recording medium on the basis of the data which have been re-quantized by the re-quantization device;

a separation device for dividing, into a plurality of sample data sets having been sampled at the predetermined cycle and at different times, data which are obtained by limiting the bandwidth of information to be recorded to a predetermined frequency bandwidth, sampling the information at a predetermined cycle, and quantizing the sample-information into data having a predetermined number of bits;

a subtraction device which calculates a difference between the data output from the re-quantization device and the predetermined sample data output from the separation device;

a multiplexing device which multiplexes into a single data set the data output from the subtraction device and the sample data, which are output from the separation device but differ from the predetermined sample data; and a second writing device for recording data on the other recording layer of the recording medium on the basis of the data, which have been multiplexed by the multiplexing device, at a recording density higher than that at which the first writing device records data.

3. A recorder for recording data on a recording medium, comprising:

a filtering device which limits the bandwidth of information to be recorded to a predetermined frequency bandwidth;

a conversion device which samples at a predetermined cycle the data output from the filtering device and quantizes the thus-sampled data into data having a predetermined number of bits;

a diminishing device which performs a diminishing operation on the data output from the conversion device;

a re-quantization device which re-quantizes the data output from the diminishing device into data whose number of bits is smaller than the predetermined number of bits;

a first writing device which records, at a predetermined recording density data, on a predetermined recording layer of the recording medium on the basis of the data, which has been re-quantized by the re-quantization device;

a separation device for dividing, into predetermined frequency bands, data which are obtained by limiting the bandwidth of information to be recorded to a predetermined frequency bandwidth, sampling the information at a predetermined cycle, and quantizing the sampled information into data having a predetermined number of bits;

a subtraction device which calculates a difference between the data output from the re-quantization device and the data of a certain and output from the separation device;

a multiplexing device which multiplexes into a single data set the data output from the subtraction device and the data of another frequency band output from the separation device; and a second writing device for recording data on the other recording layer of the recording medium on the basis of the data, which have been multiplexed by the multiplexing device, at a recording density higher than that at which the first writing device records data.

4. A recorder for recording data on a recording medium, comprising:

a first data output device which outputs sample data, the sample data being formed by sampling information to be recorded at a given cycle and quantizing the thus-sampled data into data having a predetermined number of bits;

a re-quantization device which re-quantizes the data output from the first data output device into data whose number of bits is smaller than the predetermined number of bits;

a first writing device which records data on a predetermined recording layer of the recording medium on the basis of the data, which has been re-quantized by the re-quantization device, at a predetermined recording density;

a second data output device which outputs data, the data being produced by sampling the information to be recorded at a cycle shorter than the predetermined cycle and quantizing the thus-sampled information into data having a predetermined number of bits; and a second writing device for recording data on the other recording layer of the recording medium on the basis of the data, which have been output from the second data output device, at a recording density higher than that at which the first writing device records data.

5. A recorder for recording data on a recording medium, comprising:

a filtering device which limits the bandwidth of information to be recorded to a predetermined frequency bandwidth;

a conversion device which sample the data output from the filtering device at a predetermined cycle and quantizes the thus-sampled data into data having a predetermined number of bits;

a diminishing device which performs a diminishing operation on the data output from the conversion device;

a re-quantization device which re-quantizes the data output from the diminishing device into data whose number of bits is smaller than the predetermined number of bits;

a first writing device which records data on a predetermined recording layer of the recording medium on the basis of the data, which has been re-quantized by the re-quantization device, at a predetermined recording density; and a second writing device for recording data on the other recording layer of the recording medium on the basis of the data, which have been output from the conversion device, at a recording density higher than that at which the first writing device records data.

6. A recording medium having a plurality of signal recording layers, wherein first data are recorded on one of the signal recording layers, and data relevant to the first data are recorded on the other signal recording layer at a recording density higher than that at which the first data are recorded; and the first data are recorded as data having a predetermined number of bits after having been re-quantized, and the relevant data include differential data pertaining to a difference between the first data and at least a portion of the data on the basis of which the first data have been re-quantized into a predetermined number of bits.

7. The recording medium as defined in claim 6, wherein the recording density corresponds to a recording density with respect to the longitudinal direction of a recording track and/or a recording density with respect to the widthwise direction of the recording track.

8. The recording medium as defined in claim 6, wherein the relevant data complement the first data.

9. The recording medium as defined in claim 6, wherein the relevant data are intended to improve the quality of the first data further.

* * * * *